(12) United States Patent
Rustomji et al.

(10) Patent No.: US 10,998,143 B2
(45) Date of Patent: May 4, 2021

(54) ELECTROCHEMICAL ENERGY STORAGE DEVICE

(71) Applicant: The Regents of the University of California, Oakland, CA (US)

(72) Inventors: Cyrus Rustomji, San Diego, CA (US); Ying Shirley Meng, San Diego, CA (US); Yangyuchen Yang, La Jolla, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 199 days.

(21) Appl. No.: 16/305,034

(22) PCT Filed: Apr. 27, 2017

(86) PCT No.: PCT/US2017/029821
§ 371 (c)(1),
(2) Date: Nov. 27, 2018

(87) PCT Pub. No.: WO2017/204984
PCT Pub. Date: Nov. 30, 2017

(65) Prior Publication Data
US 2020/0266007 A1     Aug. 20, 2020

Related U.S. Application Data
(60) Provisional application No. 62/342,838, filed on May 27, 2016.

(51) Int. Cl.
*H01G 11/78* (2013.01)
*H01G 11/14* (2013.01)
(Continued)

(52) U.S. Cl.
CPC ............. *H01G 11/78* (2013.01); *H01G 11/14* (2013.01); *H01G 11/36* (2013.01); *H01G 11/60* (2013.01);
(Continued)

(58) Field of Classification Search
None
See application file for complete search history.

(56) References Cited

U.S. PATENT DOCUMENTS 2,310,080 A     2/1943   Hill
2,863,933 A  *  12/1958  Minnick ................. H01M 6/14
                                                                     429/50

(Continued)

FOREIGN PATENT DOCUMENTS

EP        2144325 A1       1/2010
JP        73-076030    *  10/1973    ............. H01M 6/14
(Continued)

OTHER PUBLICATIONS

Crystal et al. (WO 2015074006) (Abstract) (May 21, 2015) (Year: 2015).*

(Continued)

*Primary Examiner* — Carmen V Lyles-Irving
(74) *Attorney, Agent, or Firm* — Manuel F. de la Cerra

(57) ABSTRACT

Electrochemical energy storage devices utilize ionic conducting electrolyte solution to carry charge between positive and negative electrodes. The electrolyte solutions use a mixture of solvent and salt and additional components, or additives, for improved electrochemical stability of the device. In an exemplary embodiment, an electrochemical device includes an electrolyte and housing to provide a pressurized condition for the electrolyte, and electrodes in contact with the electrolyte.

7 Claims, 23 Drawing Sheets

(51) Int. Cl.
  H01G 11/36   (2013.01)
  H01G 11/60   (2013.01)
  H01G 11/62   (2013.01)
  H01G 11/64   (2013.01)
  H01M 10/0525 (2010.01)
  H01M 10/054  (2010.01)
  H01M 10/0569 (2010.01)

(52) U.S. Cl.
  CPC ............ *H01G 11/62* (2013.01); *H01G 11/64* (2013.01); *H01M 10/054* (2013.01); *H01M 10/0525* (2013.01); *H01M 10/0569* (2013.01)

(56) References Cited

U.S. PATENT DOCUMENTS

| | | | |
|---|---|---|---|
| 3,540,929 | A | 11/1970 | Carlson |
| 4,460,666 | A | 7/1984 | Dinkier |
| 5,011,751 | A | 4/1991 | Yoneyama |
| 5,213,908 | A | 5/1993 | Hagedorn |
| 5,702,845 | A | 12/1997 | Kawakami et al. |
| 5,753,389 | A | 5/1998 | Gan et al. |
| 5,770,033 | A | 6/1998 | Murphy et al. |
| 2001/0049051 | A1 | 12/2001 | Jones |
| 2004/0131934 | A1 | 7/2004 | Sugnaux |
| 2004/0258989 | A1 | 12/2004 | Lee |
| 2005/0016840 | A1 | 1/2005 | Petillo |
| 2007/0099089 | A1 | 5/2007 | Miura |
| 2011/0003207 | A1 | 1/2011 | Oh |
| 2011/0236766 | A1 | 9/2011 | Kolosnitsyn |
| 2012/0107650 | A1 | 5/2012 | Kritzer |
| 2012/0189937 | A1 | 7/2012 | Dophle et al. |
| 2013/0209865 | A1* | 8/2013 | Kim .................. H01M 4/621 429/163 |
| 2015/0072248 | A1 | 3/2015 | Watanabe |
| 2016/0261005 | A1* | 9/2016 | Rustomji ............ H01G 11/60 |
| 2017/0346134 | A1 | 11/2017 | Bandhauer |
| 2018/0375156 | A1 | 12/2018 | Zhamu et al. |

FOREIGN PATENT DOCUMENTS

| | | |
|---|---|---|
| JP | H1040958 A | 2/1998 |
| JP | 2015041526 A | 3/2015 |
| JP | 2016152231 A | 8/2016 |
| WO | 2015074006 A1 | 5/2015 |
| WO | 2017204984 A | 11/2017 |

OTHER PUBLICATIONS

Crystal et al. (WO 2015074006) (Detailed Description) (May 21, 2015) (Year: 2015).*
Crystal et al. (WO 2015074006) (Fig. 18) (May 21, 2015) (Year: 2015).*
International Search Report and Written Opinion for PCT Application No. PCT/US2019/032413, dated Jul. 30, 2019, 13 pages.
International Search Report and Written Opinion for PCT Application No. PCT/US2019/032414, dated Aug. 2, 2019, 16 pages.
International Search Report and Written Opinion for PCT Application No. PCT/US2017/029821, dated Sep. 7, 2017, 10 pages.
Abbott, et al., "Electrochemical investigations in liquid and supercritical 1,1,1,2-tetrafluoroethane (H FC 134a) and difluoromethane (HFC 32)," J. ElectroanaL Chern., vol. 457, 1998, pp. 1-4.
Bard, A., "New challenges in electrochemistry and electroanalysis," Pure & AppL Chem., vol. 64, 1992, pp. 185-192.
Bruno, et al., "Electrochemical Oxidation of C602+ and C603+", J. Am. Chem. Soc., vol. 125,2003, pp. 15738-15739.
Garcia, et al., "Electrochemistry in Liquid S02," J. Electrochem. Soc., vol. 137, 1990, pp. 2752-2759.
Iwama, et al., "Characterization of commercial supercapacitors for low temperature applications," J. Power Sources, vol. 219, 2012, p. 235-239.
Ke, et al., Electrodeposition of germanium from supercritical fluids: Phys. Chern. Chem. Phys., vol. 14,2012, pp. 1517-1528.
Simon, et al., "Materials for electrochemcial capacitors," Nature Materials, vol. 7,2008, pp. 845-854.
Extended European Search Report for European Patent Application No. 14861242.7; dated Mar. 1, 2017.
Amatucci et al., "Fluoride based electrode materials for advanced energy storage devices," Journal of Fluorine Chemistry, 128, 243-262 (2007).
Liu et al., "Hllow Nanostructured Anode Materials for Li-Ion Batteries," Nanoscale Res Lett, 5:1525-1534 (2010) Abstract, p. 1525, col. 1-2.
Mukerjee, "Particle size and structural effects in platinum electrocatalysis," Journal of Applied Electrochemistry, 20, 537-548 (1990) p. 537, para 2.
Abbott, A. et al., "Conductivity of (C4H9)4N BF4 in Liquid and Supercritical Hydrofluorocarbons", J. Phys. Chern. B 2000, vol. 104, pp. 9351-9355.
Linden, D. et al., "The Lithium-Sulfur Dioxide Primary Battery—Its Characteristics, Performance and Applications", Journal of Power Sources, 1980, vol. 5, pp. 35-55.
West, w.e. et al., "Sulfuryl and Thionyl Halide-Based Ultralow Temperature Primary Batteries", Journal of the Electrochemical Society, 2010, vol. 157, pp. A571-A577.
International Search Report and Written Opinion for PCT Application No. PCT/US2014/66015, dated Apr. 13, 2015, 15 pages.

* cited by examiner

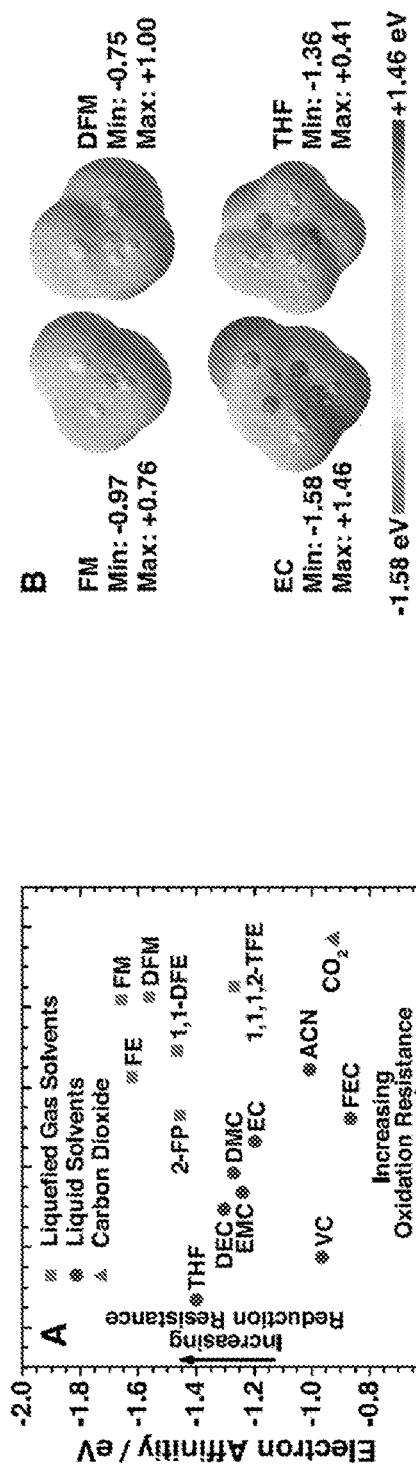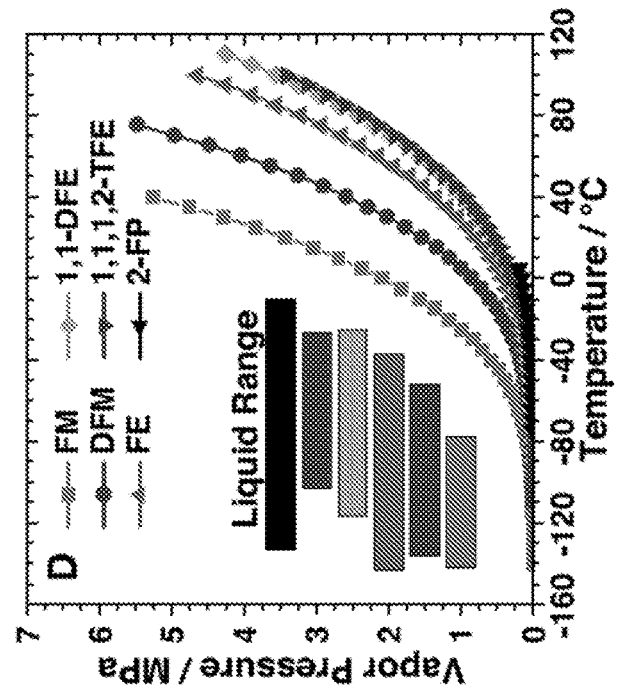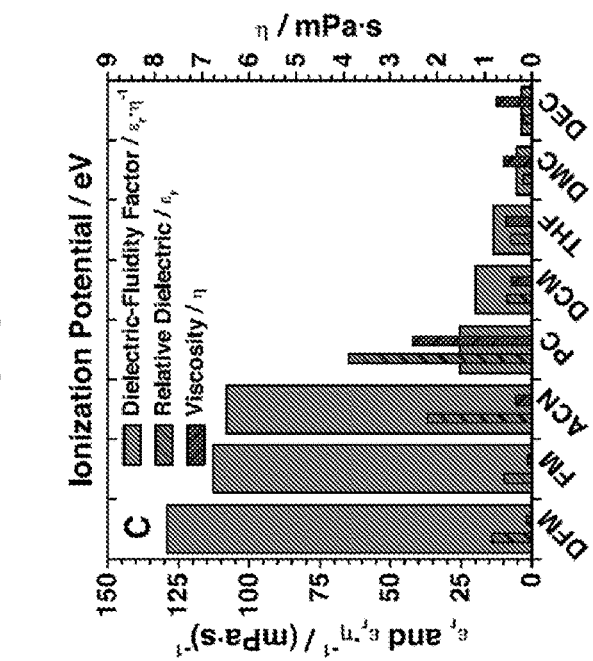
FIG. 8A
FIG. 8B
FIG. 8C
FIG. 8D

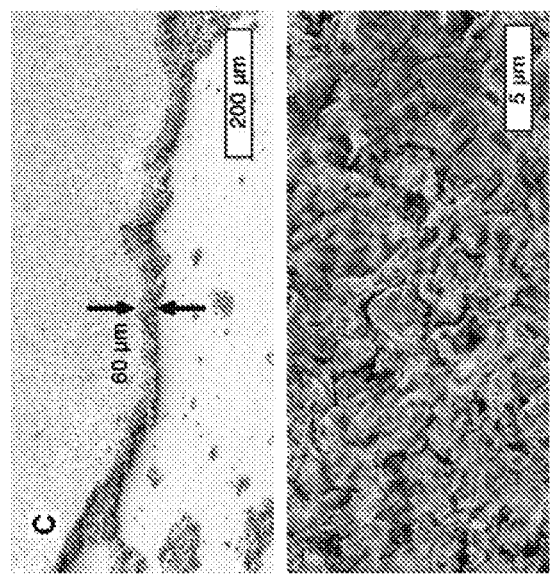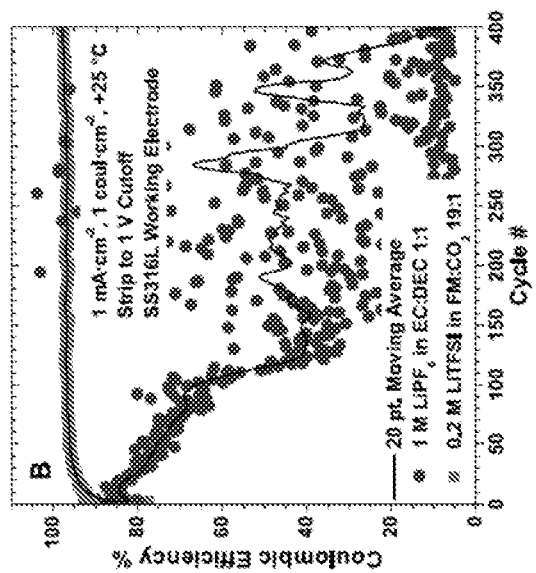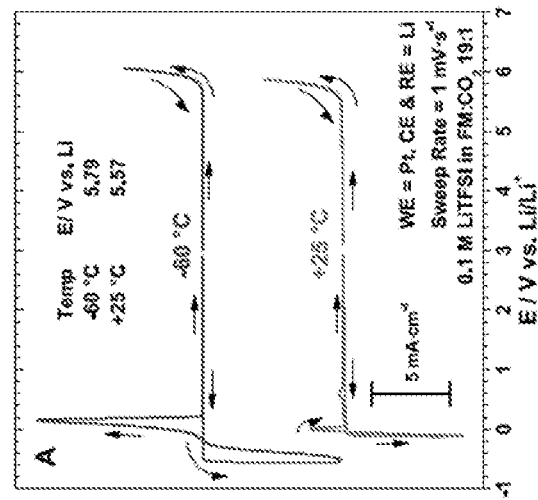
FIG. 11C
FIG. 11B
FIG. 11A

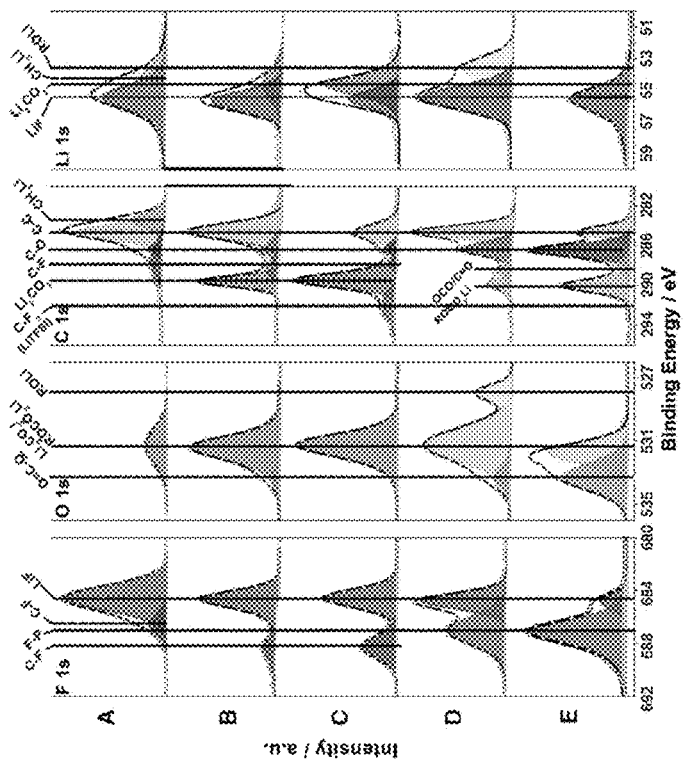
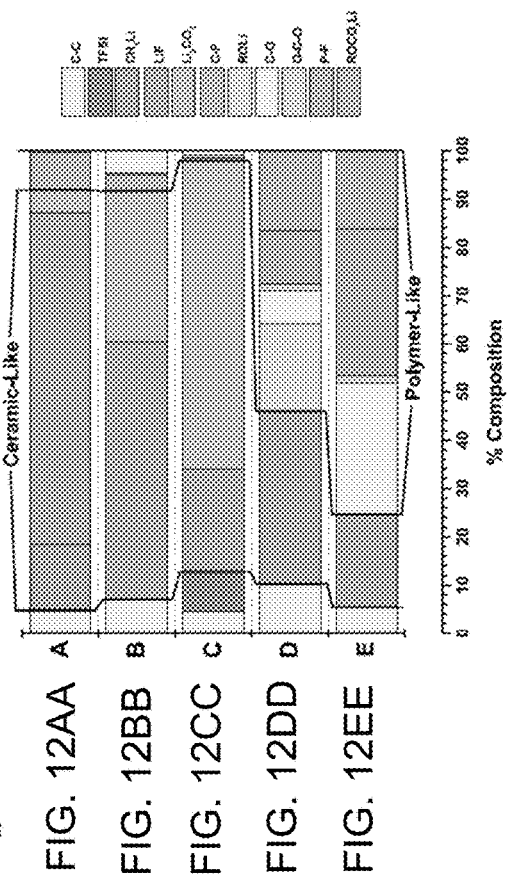
FIG. 12A
FIG. 12B
FIG. 12C
FIG. 12D
FIG. 12E
FIG. 12AA
FIG. 12BB
FIG. 12CC
FIG. 12DD
FIG. 12EE

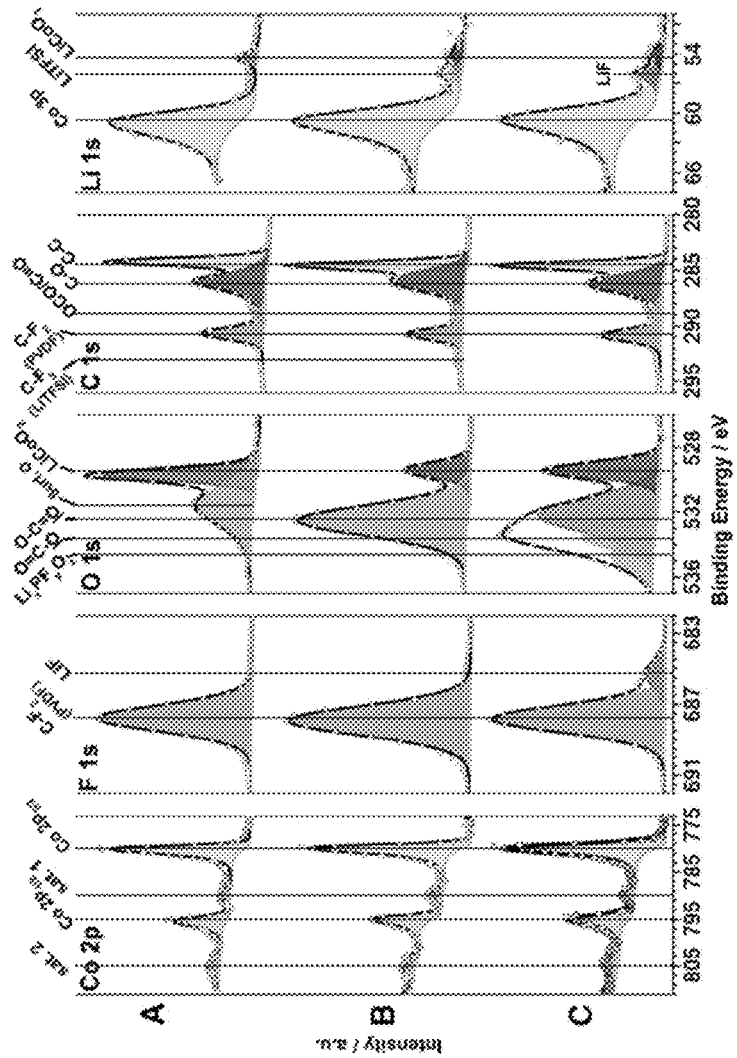
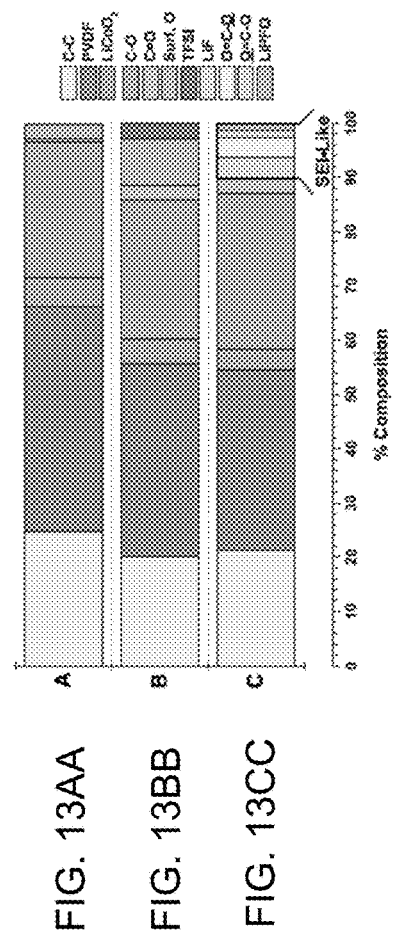
FIG. 13A
FIG. 13B
FIG. 13C
FIG. 13AA
FIG. 13BB
FIG. 13CC

ELECTROCHEMICAL ENERGY STORAGE DEVICE

CROSS-REFERENCE TO RELATED APPLICATIONS

This patent document is a 371 National Phase Application of PCT Application No. PCT/US2017/029821, entitled "ELECTROCHEMICAL ENERGY STORAGE DEVICE", filed on Apr. 27, 2017, which claims priorities to and benefits from U.S. Provisional Patent Application No. 62/342,838, entitled "NOVEL ELECTROCHEMICAL ENERGY STORAGE DEVICE," filed on May 27, 2016. The entire contents of the aforementioned patent applications are incorporated by reference as part of the disclosure of this patent document.

STATEMENT REGARDING FEDERALLY SPONSORED RESEARCH OR DEVELOPMENT

This invention was made with government support under grant DE-AR0000646 awarded by the Department of Energy's Advanced Research Projections Agency-Energy (ARPA-E). The government has certain rights in the invention.

SUMMARY

In an exemplary embodiment, an electrochemical device is disclosed. The electrochemical device comprises: an ionically conducting electrolyte comprising one or more salts and a solution of one or more compressed gas solvents, wherein each compressed gas solvent is in one of a liquid only phase and a combined gas phase and liquid phase, and wherein the solution of one or more compressed gas solvents has a vapor pressure above an atmospheric pressure at a room temperature; a housing enclosing the ionically conducting electrolyte and structured to provide a pressurized condition to the one or more salts and the solution of one or more compressed gas solvents; and a pair of electrodes in contact with the ionically conducting electrolyte.

In the exemplary electrochemical device, the compressed gas solvents include one or more of: fluoromethane, difluoromethane, fluoroethane, difluoromethane, chloromethane, chloroethane, carbon dioxide, tetrafluoroethane, difluoroethane, and difluorochloromethane.

In the exemplary electrochemical device, the one or more salts include one or more of: lithium bis(trifluoromethanesulfonyl)imide, lithium hexafluorophosphate, lithium perchlorate, lithium tetrachloroaluminate, lithium tetragaliumaluminate, lithium bis(fluorosulfonyl)imide, lithium aluminum fluoride, lithium hexafluoroarsenate, lithium chloroaluminate, lithium chlorotitanate, lithium hexafluorotinate, lithium tetrabromoaluminate, lithium tetrachloroborate, lithium tetrafluoroborate, lithium tetrachloroaluminate, sodium hexafluorophosphate, and magnesium hexafluorophosphate.

In the exemplary embodiment, the electrochemical device further comprises additional gaseous electrolytes that include one or more of: sulfur dioxide, carbon disulfide, oxygen, nitrogen, and ammonia.

In the exemplary electrochemical device, at least one of the pair of electrodes is comprised of any one of: lithium, sodium, magnesium, potassium, sulfur, and oxygen.

In another exemplary embodiment, an electrochemical device comprises an ionically conducting catholyte comprising one or more salts and a solution of one or more compressed gas catholytes, wherein each compressed gas catholyte is in one of a liquid only phase and a combined gas phase and liquid phase, and wherein the solution of the one or more compressed gas catholytes has a vapor pressure above an atmospheric pressure at a room temperature; a housing enclosing the ionically conducting catholyte and structured to provide a pressurized condition to one or more salts and the solution of one or more compressed gas catholytes; and an anode electrode and a cathode current collector in contact with the ionically conducting catholyte.

In the exemplary electrochemical device, the compressed gas catholytes includes one or more of: thionyl fluoride, thionyl chloride fluoride, phosphoryl fluoride, phosphoryl chloride fluoride, sulfuryl fluoride, and sulfuryl chloride fluoride.

In the exemplary electrochemical device, the one or more salts include one or more of: lithium bis(trifluoromethanesulfonyl)imide, lithium hexafluorophosphate, lithium perchlorate, lithium tetrachloroaluminate, lithium tetragaliumaluminate, lithium bis(fluorosulfonyl)imide, lithium aluminum fluoride, lithium hexafluoroarsenate, lithium chloroaluminate, lithium chlorotitanate, lithium hexafluorotinate, lithium tetrabromoaluminate, lithium tetrachloroborate, lithium tetrafluoroborate, lithium tetrachloroaluminate, sodium hexafluorophosphate, and magnesium hexafluorophosphate.

In the exemplary embodiment, the electrochemical device further comprises additives that include one or more of: lithium chloride, lithium fluoride, sodium fluoride, sodium chloride, bromine chloride, bromo fluoride, chloride, and fluoride.

In the exemplary electrochemical device, the anode is comprised of one or more of: lithium, sodium, calcium, magnesium, aluminum, iron, zinc, cadmium, lead.

In the exemplary electrochemical device, the cathode current collector is comprised of one or more of: activated carbon, carbon black, and carbon nanotubes.

An exemplary method of forming a liquefied gas electrolyte solution is also disclosed. The exemplary method comprises: loading a predetermined weighed amount of salt into a cell, wherein the predetermined weighed amount of salt depends on a concentration of the salt and a volume of a compressed gas solvent; cooling the cell to a first temperature below a second temperature of a source of the compressed gas solvent; evaporating from the source a controlled amount of the compressed gas solvent and condensing the compressed gas solvent into the cell; and sealing shut the cell.

In the exemplary method of forming a liquefied gas electrolyte solution, the condensing operation is performed using one of: a mass flow controller and a mass flow meter through a tube connected to the cell.

In the exemplary method of forming a liquefied gas electrolyte solution, the sealing shut operation is performed using any one of: a valve, a plug, and a welded cover.

BACKGROUND

This patent document relates to electrochemical materials and electrochemical energy storage devices.

BRIEF DESCRIPTION OF DRAWINGS

FIGS. 8A-8D illustrate the physical and chemical properties of liquefied gas solvents.

FIGS. 11A-11F illustrate electrochemical stability of fluoromethane and carbon dioxide and its use in lithium batteries.

FIGS. 12A-12EE illustrate XPS spectra and calculated percent composition of lithium metal surface products.

FIGS. 13A-13CC illustrate XPS spectra and calculated percent composition of a LiCoO$_2$ electrode.

DETAILED DESCRIPTION

Figure 1:
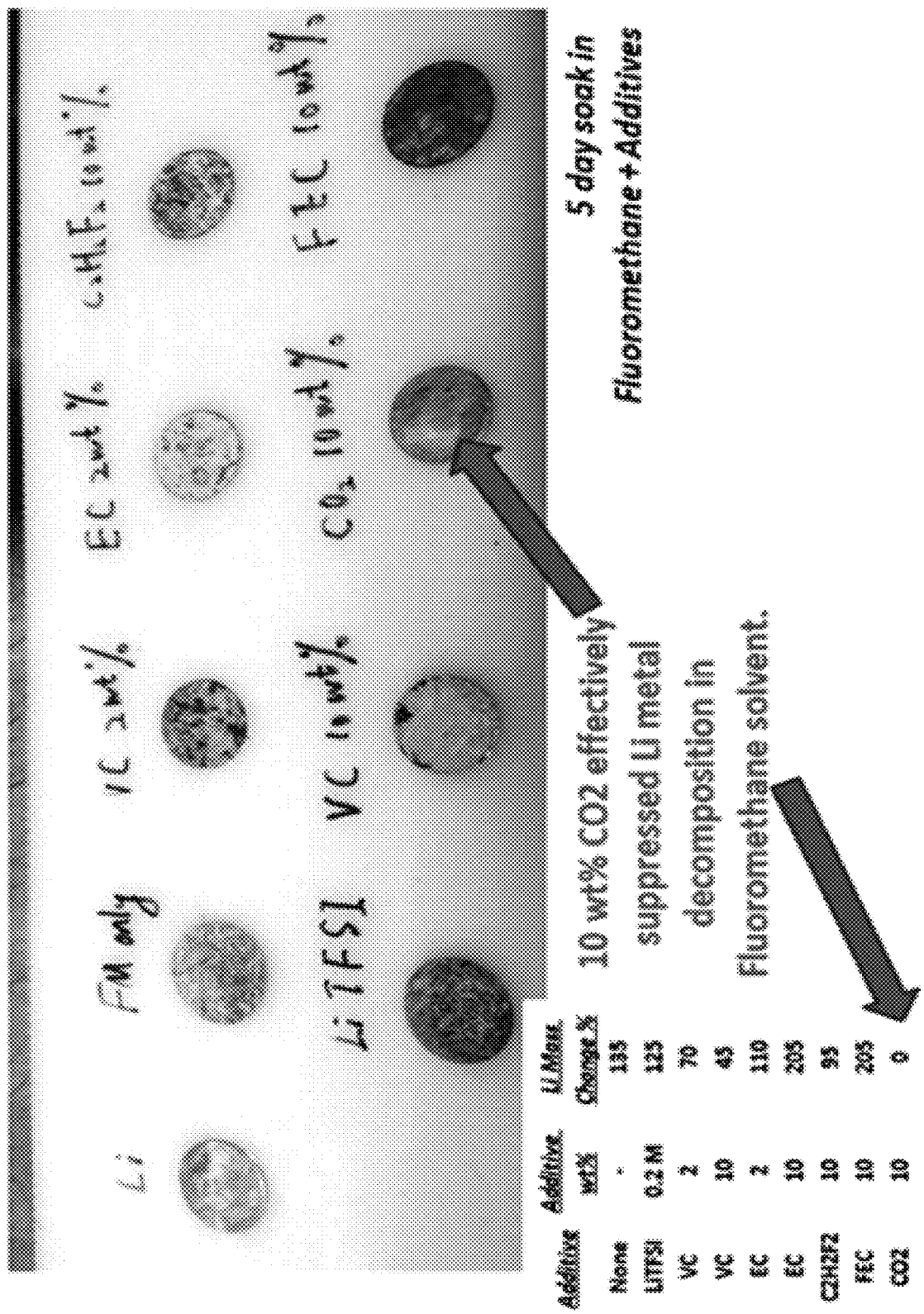
FIG. 1 shows exemplary optical images of lithium metal soaked in fluoromethane with various electrolyte additive components at smaller weight percent for five days.

In the description, section headings are used to improve readability and do not limit the features and scope of the described embodiments to specific sections. In this document, the term "exemplary" is used to mean "as an example" and, unless otherwise stated, does not mean that the described feature is ideal or preferred in any way.

Electrochemical energy storage devices, such as batteries and double layer capacitors, utilize an ionic conducting electrolyte solution to carry charge between positive and negative electrodes. The electrolyte solutions use a mixture of some amount of solvent and salt and additional components, or additives, for improved electrochemical stability of the device. Common components include vinyl carbonate, fluoroethylene carbonate, lithium bis(oxalato)borate among others. Such additives help in surface modification of electrodes, safety aspects or in other useful ways.

Electrolyte components are generally liquid or solid over temperatures and internal device pressures commonly encountered through device operation. Some components that are gaseous at such temperatures and pressures, such as carbon dioxide, may be added in small amounts to the electrolyte solution through bubbling into the solution to saturate the solution with the gaseous component, however, the amounts are limited to <1 wt % because of limited solubility.

The energy density of electrochemical batteries is proportional to the operating voltage and capacity. The capacity of a battery device is dependent on the capacity of the anode and cathode electrodes. Most commonly, both the anode and cathode are made up of solid-state materials; however, some liquid-based electrodes, or catholytes, have also been used in primary battery devices. One benefit to using a liquid catholyte as a battery electrode is its much higher capacity than typical solid-state electrode. These types of primary batteries typically reach end of life when the current collector's surface, typically a high surface area carbon, is electrically or ionically insulated by reaction products. The voltage of these types of batteries during discharge is typically found to be stable and dependent on the potential difference between the reactants and products of the chemical reactions within the battery. Therefore, increasing the capacity by improving the life of the high surface area current collector and increasing the voltage of the device can be very useful in developing higher energy density of battery devices. Typically, these primary batteries also show excellent low temperature characteristics since the catholytes are low melting point materials.

Some electrolyte components which are exceptionally useful to electrochemical energy storage devices have limited practical application due to the gaseous nature of the component. Because the electrolyte component has a high vapor pressure at standard room temperature and pressure, very little of the electrolyte component is soluble in the electrolyte solution and instead escapes as a gas. In addition, because the component has a high vapor pressure at standard room temperature (approximately 20 to 22° C.) and standard pressure (approximately 1.01325 bar), the electrolyte component tends to be volatile.

In an exemplary embodiment, an electrochemical device can operate beyond standard pressures so that the device is operated at an increased internal pressure. This increased pressure allows the typically gaseous electrolyte component to remain in the liquid phase, or have a higher gas concentration. By having the internal cell operate at an increased pressure, the more of the electrolyte component can be inserted into the cell. Having a higher weight percent of such components benefits the cell operation. For example, having an increased amount of carbon dioxide in a cell may provide a better electrode surface layer on positive electrode or negative electrode to prevent parasitic electrochemical reactions from occurring. Another example would be the addition of carbon dioxide to lower the flammability of the electrolyte. Chemicals other than carbon dioxide as described in this patent document may have a similar effect. Another example would be the addition of material to lower or raise the pressure of the electrolyte solution.

In some embodiments, a number of gaseous solvents act as solvents for the electrochemical energy storage device when liquefied under pressure. Examples of such gaseous solvents include Fluoromethane, difluoromethane, fluoroethane, difluoromethane, chloromethane, chloroethane, etc. Additional gaseous electrolyte components that may be added to these solvents in any amount to improve the device for beneficial performance include carbon dioxide, sulfur dioxide, carbon disulfide, oxygen, nitrogen, ammonia, etc.

As shown in FIG. 1, a series of tests were performed using various electrolyte components at different mass percentages in fluoromethane to test decomposition of lithium metal. It is known that fluoromethane by itself decomposes lithium metal into a ceramic powder. By adding carbon dioxide under increased pressure at 10 wt % in fluoromethane, the lithium metal is highly protected from decomposition. This protection of the lithium metal is due to an improved surface-electrolyte-interphase which is electrically insulating, blocking further decomposition of the electrolyte components. FIG. 1 shows exemplary optical images of lithium metal soaked in fluoromethane with various electrolyte additive components at smaller weight percent for 5 days. The table shows the lithium mass change % after five days of soaking lithium in a fluoromethane solvent with various additives. As shown in FIG. 1, the lithium mass did not change when lithium was soaked for five days in a fluoromethane solvent with a 10 wt % carbon dioxide additive. As a result, in some embodiments, the lithium metal is protected from decomposition by adding carbon dioxide under increased pressure at 10 wt % in fluoromethane.

Figure 2:
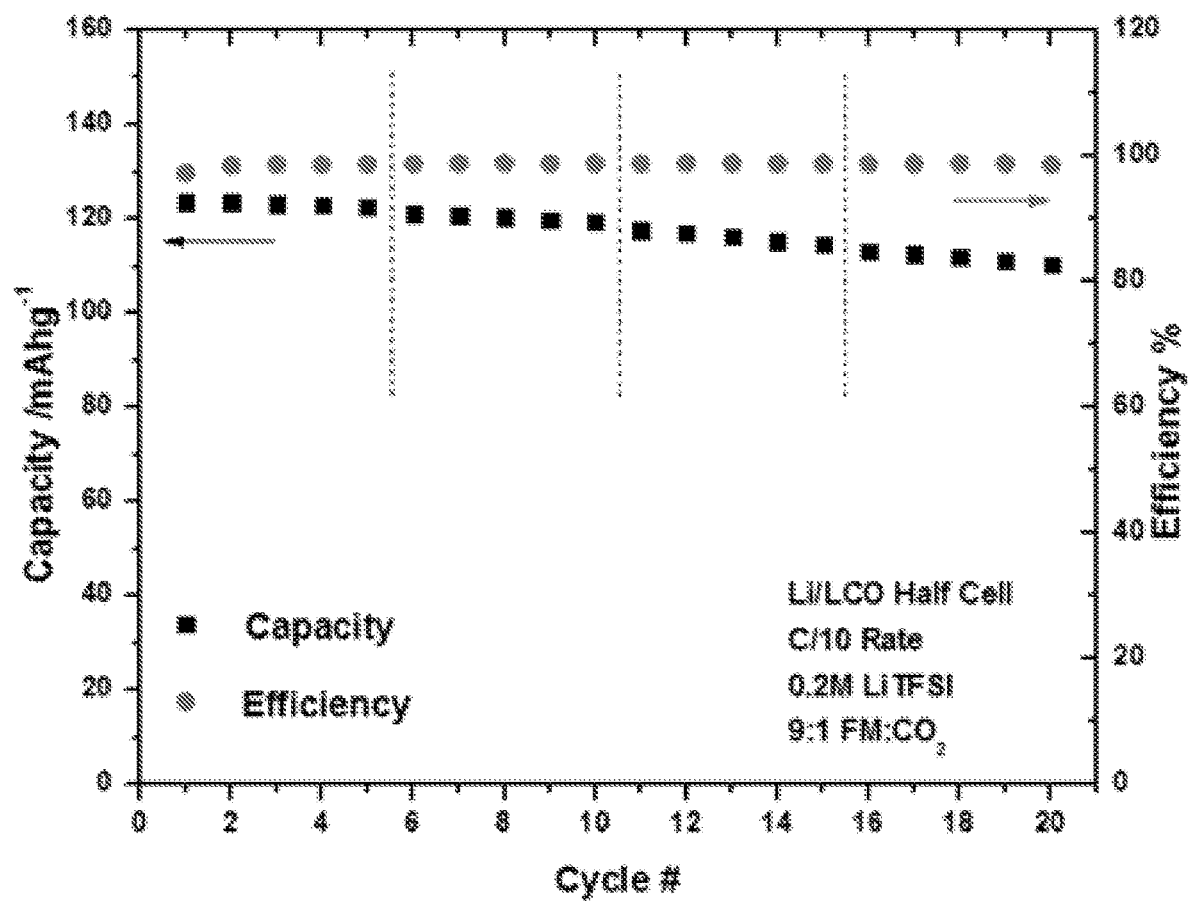
FIG. 2 shows an exemplary electrochemical performance of a Lithium Cobalt Oxide (LiCoO$_2$) cathode with a lithium metal anode with an electrolyte composed of 0.2 molar (M) Lithium bis(trifluoromethanesulfonyl)imide (LiTFSI) in 9:1 ratio by weight of Fluoromethane:Carbon Dioxide.

FIG. 2 shows an exemplary electrochemical performance of a Lithium Cobalt Oxide ($LiCoO_2$) cathode with a lithium metal anode with an electrolyte composed of 0.2 molar (M) Lithium bis(trifluoromethanesulfonyl)imide (LiTFSI) in 9:1 ratio by weight of Fluoromethane:Carbon Dioxide. A substantial amount of carbon dioxide was allowed in the electrolyte in liquid form, since the cell operated under increased internal pressure.

Figure 3:
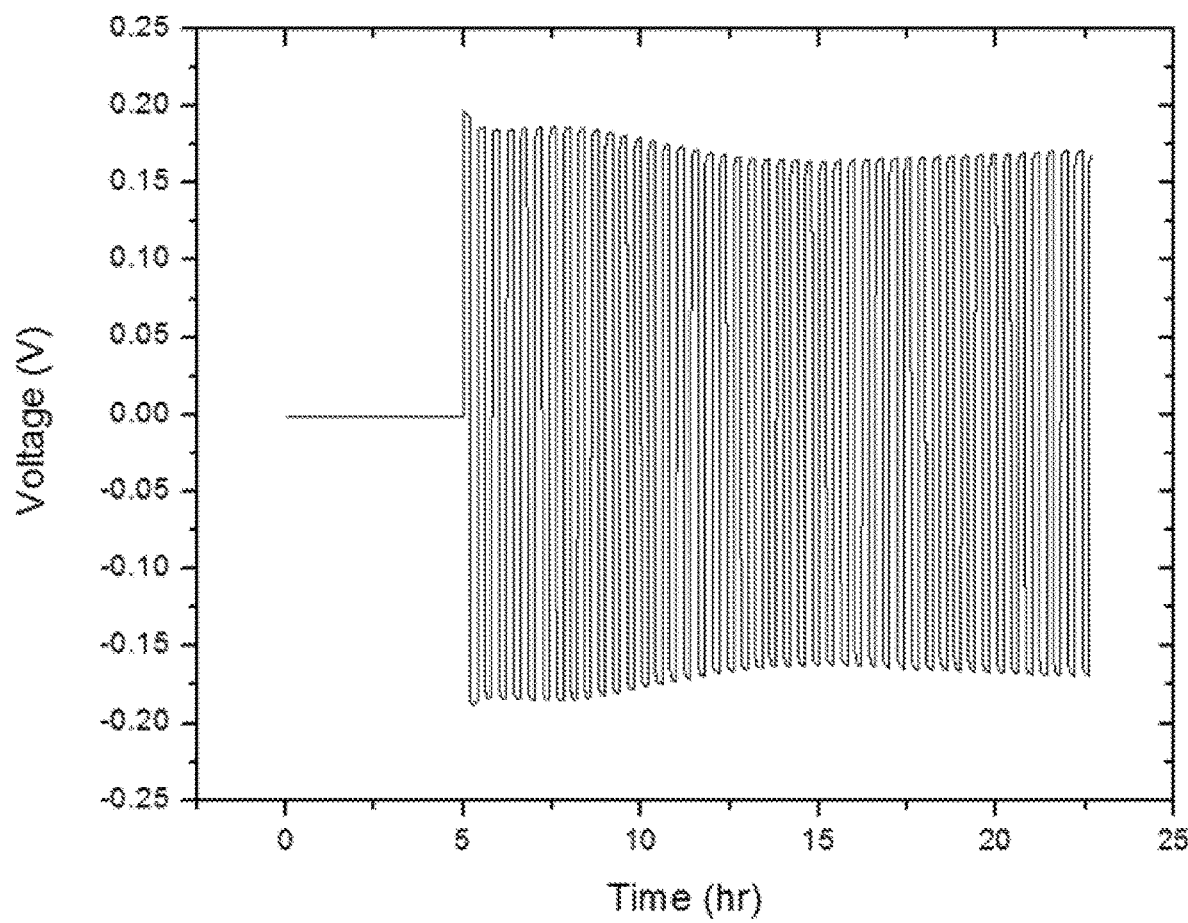
FIG. 3 shows an exemplary Lithium|Lithium symmetric cell with 0.2M Lithium bis(trifluoromethanesulfonyl)imide (LiTFSI) salt in 19:1 Fluoromethane:CO2 solvent cycled at 1 mA/cm2 current density.

Further, other beneficial properties of the exemplary electrochemical energy storage device include the relatively high electrolyte ionic conductivity, which allows ion transport. Further, this electrolyte shows good suppression of unwanted dendritic formation during ion transport to the metal surface. FIG. 3 shows an exemplary Lithium Lithium symmetric cell with 0.2M Lithium bis(trifluoromethanesulfonyl)imide (LiTFSI) salt in 19:1 Fluoromethane:CO2 solvent cycled at positive 1 mA/cm2 current density followed by negative 1 mA/cm2 current density for an equal amount of time for an equal total charge passed. This high current cycling would generally show dendritic growth and shorting of the two electrodes. It is demonstrated here that this dendritic growth does not occur, and there is no shorting of the cell, which would otherwise be seen at a drop in voltage to near zero. This demonstrates the effectiveness of CO2 for forming a good solid-electrolyte interphase (SEI) on lithium metal, allowing it to be cycled with steady voltage at high rates, suppressing dendritic formation. Metals other than lithium may be used for the anode and may show similar features including sodium, magnesium, potassium, etc. The suppression of dendritic growth is ideal, since it allows use of a lithium metal anode in lithium batteries, which have a superior energy density.

Figure 4:
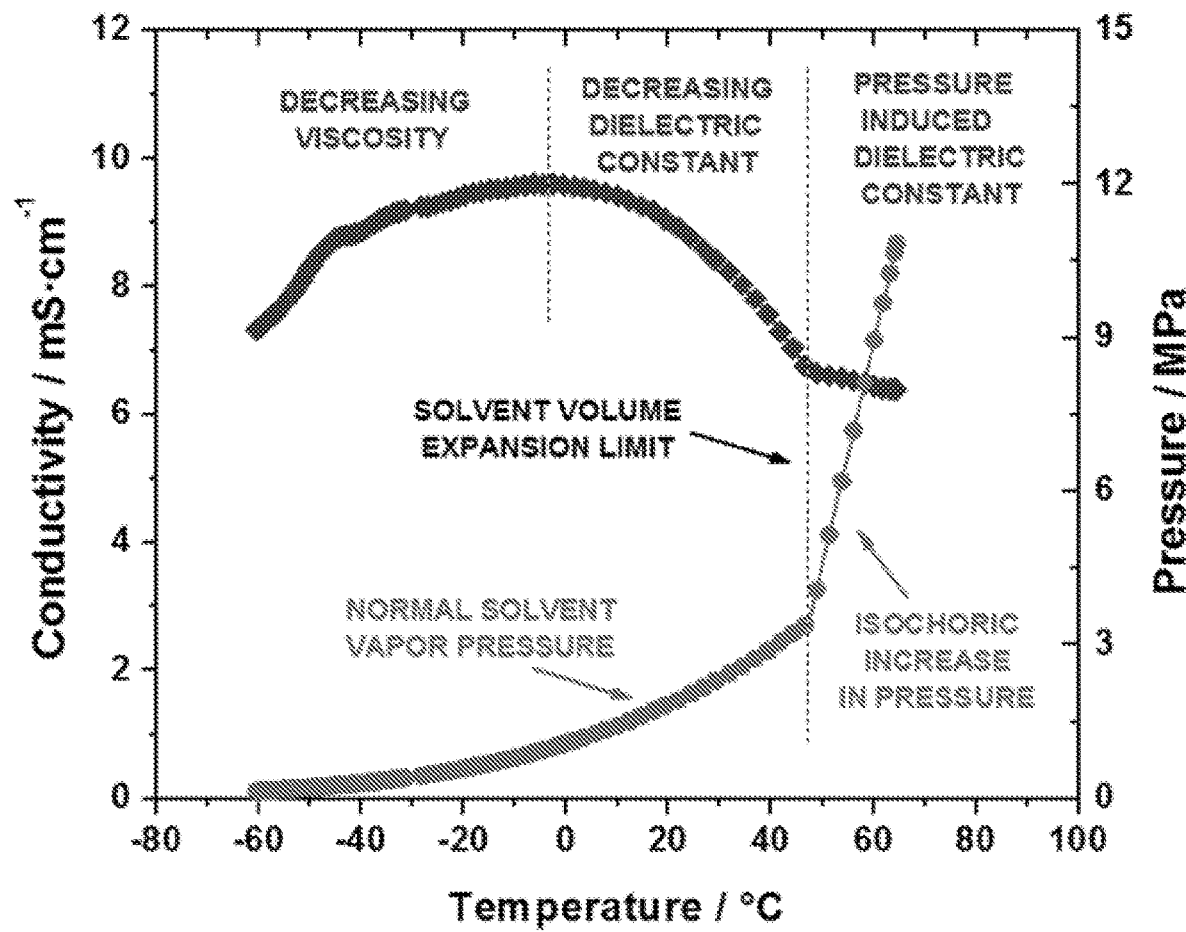
FIG. 4 demonstrates an increase in conductivity of the exemplary electrolyte due to an increase in cell pressure.

In some embodiments, increasing the conductivity of the electrolyte may be possible via an increase in the dielectric constant, done via applying a high pressure. FIG. 4 demonstrates an increase in conductivity of the exemplary electrolyte due to an increase in cell pressure. In this example, the conductivity and pressure of an electrolyte solution, 0.1 M $TBAPF_6$ in difluoromethane. At a temperature of +48 C., there is an increase in pressure due to the thermal expansion of the electrolyte, which occupies the entire cell volume, then at increased temperatures results in an increase in pressure. This increase in pressure increases the dielectric constant of the electrolyte which then increases the conductivity of the electrolyte. Typically, pressures within a conventional electrochemical device are minimal since they are assembled near atmospheric pressure. By applying an additional pressure, via externally induced during assembly, such as applying pressure via an insoluble gas such as argon or nitrogen, or by chemical composition of the electrolyte, such as including a high-pressure gas such as carbon dioxide, which may be soluble in the electrolyte, an increase in electrolyte conductivity may be seen.

In some embodiments, an electrochemical energy storage device uses an electrolyte based on compressed gas solvents, which have a vapor pressure greater than atmospheric pressure of 1.01325 bar at 20° C. where the primary electrochemical reaction at the cathode surface includes and deals with sulfur or oxygen in which lithium sulfides or lithium oxides are generated and is a reversible reaction, creating a rechargeable battery device. In some embodiments, the compressed gas solvents can exists in a housing in a liquid only phase. For instance, as shown in the pressure graph of FIG. 9A, during thermal expansion, the volume of the solvent in a liquid phase may occupy the entire cell housing. In some embodiments, the compressed gas solvents can exists in a combined gas phase and liquid phase. For example, as shown in the pressure graph FIG. 9A, at lower temperatures the pressure curve follows the normal solvent vapor pressure, which implies a combined liquid phase and gas phase. In the particular electrolyte solvent used which has the high vapor pressure, these reactants are not soluble as opposed to traditional liquid electrolyte in which these reaction products are soluble. The solubility of these reactants is what limits the reversibility of these types of energy storage devices, since active material is then lost within the electrolyte solution itself. Such high vapor pressure solvents may be composed of Fluoromethane or difluoromethane or carbon dioxide, tetrafluoroethane, difluoroethane, difluorochloromethane, etc.

Figure 5:
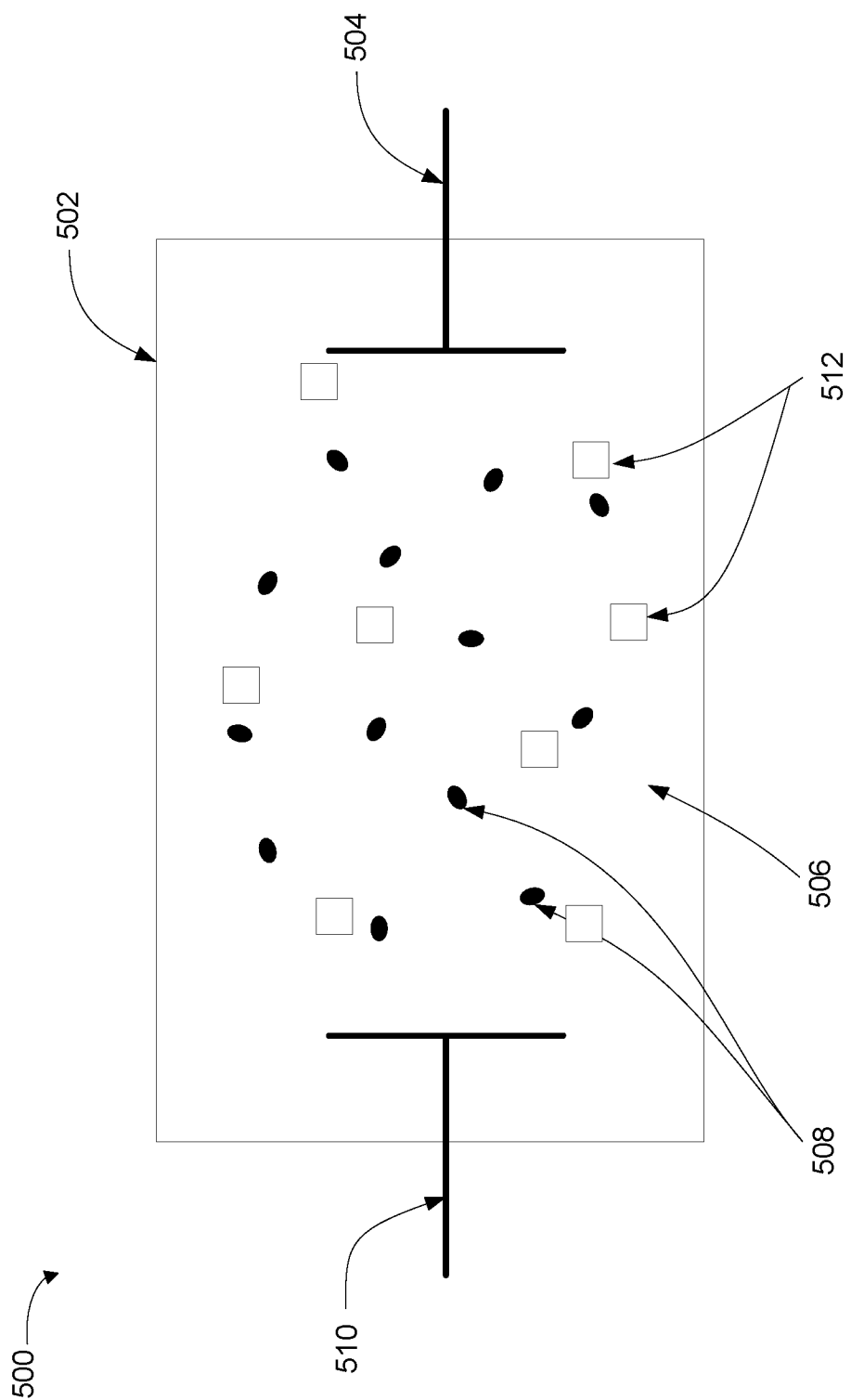
FIG. 5 illustrates an exemplary electrochemical device.

FIG. 5 illustrates an exemplary electrochemical device (500). The electrochemical device (500) comprises an ionically conducting electrolyte (506) comprising one or more salts (512) and a solution of one or more compressed gas solvents (508), wherein each compressed gas solvent (508) is in one of a liquid only phase, and a combined gas phase and liquid phase, and wherein the solution of one or more compressed gas solvents (508) has a vapor pressure above an atmospheric pressure at a room temperature. The electrochemical device also includes: a housing (502) enclosing the ionically conducting electrolyte (506) and structured to provide a pressurized condition to the one or more salts (512) and the solution of one or more compressed gas solvents (508); and a pair of electrodes (504), (510) in contact with the ionically conducting electrolyte (506).

In another exemplary embodiment, electrolyte solutions can be designed to act as a liquid electrode, or catholyte, and also function as chemical reactants, based on compressed gas catholytes exhibiting a vapor pressure greater than atmospheric pressure of 1.01325 bar at 20° C. In some embodiments, the compressed gas catholytes can exist in a housing in a liquid only phase. For instance, as shown in the pressure graph of FIG. 9A, during thermal expansion, the volume of the catholyte in a liquid phase may occupy the entire cell housing. In some embodiments, the compressed gas catholytes can exists in a combined gas phase and liquid phase. For example, as shown in the pressure graph FIG. 9A, at lower temperatures the pressure curve follows the normal catholyte vapor pressure, which implies a combined liquid phase and gas phase. When used as a liquid electrode in battery devices, an improved battery voltage, power, capacity, life or temperature capability is observed. Examples of such a class of compressed gas solvents that may be used as a liquid electrode include thionyl fluoride, thionyl chloride fluoride, phosphoryl fluoride, phosphoryl chloride fluoride, sulfuryl fluoride, sulfuryl chloride fluoride, or any other compressed gas solvent that shows similarly improved battery characteristics, or a mixture of two or more compressed gas solvents, or a mixture of any number of compressed gas solvents with conventional liquid solvents. While there are liquid electrodes, such as sulfur dioxide, that meet these criteria, these liquid electrodes are solubilized into liquid solvents, rendering the overall vapor pressure of the solution lower than the requirements for devices based on the disclosed technology, which also requires the use of only components, other than the ionic salt component, that have vapor pressures greater than atmospheric pressure of 1.01325 bar at 20° C. Further, some liquid cathodes commonly chemically react to form high vapor pressure materials, which then render the overall solution to have a higher than atmospheric pressure. However, the high vapor pressure of these solutions is due to the products, and not the reactants, of the chemical reaction.

In an exemplary embodiment, compressed gas solvents act as liquid cathode so that the device can be configured in a sealed and pressurized container. The pressure may be externally applied, due to the vapor pressure of the solvent itself or by pressure release. This pressure may be varied due to temperature fluctuations, changing the solvent's vapor pressure, or by an externally applied pressure or pressure release.

In some embodiments, salt is further added to the compressed gas solvent or the compressed gas catholytes to form a conducting solution. Examples of such a class of salts that may be used include lithium hexafluorophosphate, lithium perchlorate, lithium tetrachloroaluminate, lithium tetragaliumaluminate, lithium bis(trifluoromethanesulfonyl)imide, lithium bis(fluorosulfonyl)imide, lithium aluminum fluoride, lithium hexafluoroarsenate, lithium chloroaluminate, lithium chlorotitanate, lithium hexafluorotitanate, lithium tetrabromoaluminate, lithium tetrachloroborate, lithium tetrafluoroborate, lithium tetrachloroaluminate, sodium hexafluorophosphate, magnesium hexafluorophosphate, or similar salts that create a conducting solution when mixed with any of the above types of liquid electrodes.

These solutions may be act as liquid cathodes and electrolytes between a metal anode and cathode current collector. Examples of such metal anodes may include lithium, sodium, calcium, magnesium, aluminum, iron, zinc, cadmium, lead or similar metals. Examples of such cathode current collectors may be composed in some part of activated carbon, carbon black, carbon nanotubes, or similarly high surface area materials Further, any number of additives may be added to the liquid cathode and electrolyte solution to improve battery performance by increasing voltage, capacity, life, temperature ability or safety. Such additives may include lithium chloride, lithium fluoride, sodium fluoride, sodium chloride, bromine chloride, bromo fluoride, chloride, fluoride.

Conventional liquid solvents that perform as battery electrodes also act as the battery electrolyte, commonly formed by adding a salt to the liquid solvent to form a conducting solution. One example of such a conventional battery device comprises thionyl chloride solvent cathode mixed with lithium aluminum chloride salt to form a conducting solution, along with a lithium metal anode and high surface area carbon black as a current collector for the liquid cathode, with an electrically insulating separator, preventing cell short-circuit. Such a device typically shows a voltage of ~3.65 V and an operating temperature range from −60 to +85° C. Conventionally, these types of batteries form a protective layer on lithium metal to prevent further chemical reaction between lithium metal and liquid cathode until a discharge is applied, which breaks down this protective layer. A typical reaction in this type of device generally results in lithium chloride products which, since insoluble in the liquid solution, may precipitate within the pores of the carbon current collector, decreasing electronic conductivity between the liquid cathode and the carbon current collector, eventually leading to device end-of-life.

The exemplary electrochemical energy storage device includes liquid cathodes such as fluorinated compressed gas solvents to improve device performance. As a comparative example, a lithium anode and thionyl fluoride or sulfuryl fluoride catholyte-based battery may offer an increased cell voltage over a conventional lithium anode and thionyl chloride battery, due to the higher energy of reaction between the two. Rather than having lithium chloride form using a thionyl chloride liquid cathode, lithium fluoride may be formed when using a thionyl fluoride liquid cathode, which has a higher energy of reaction. Further, a thionyl fluoride liquid cathode may prolong the life of the high surface area carbon current collector, since more lithium fluoride precipitate will be required to passivate the entire high surface area carbon surface because of the smaller size of the lithium fluoride precipitate compared to lithium chloride precipitate. Even further, the thionyl fluoride compressed gas solvent-based cathode has a lower melting point than the thionyl chloride conventional liquid-based cathode, which may further extend the low temperature operating range. Lastly, the lower viscosity of thionyl fluoride compared to thionyl chloride may offer higher conductivity solutions, allowing for higher power devices.

Figure 6:
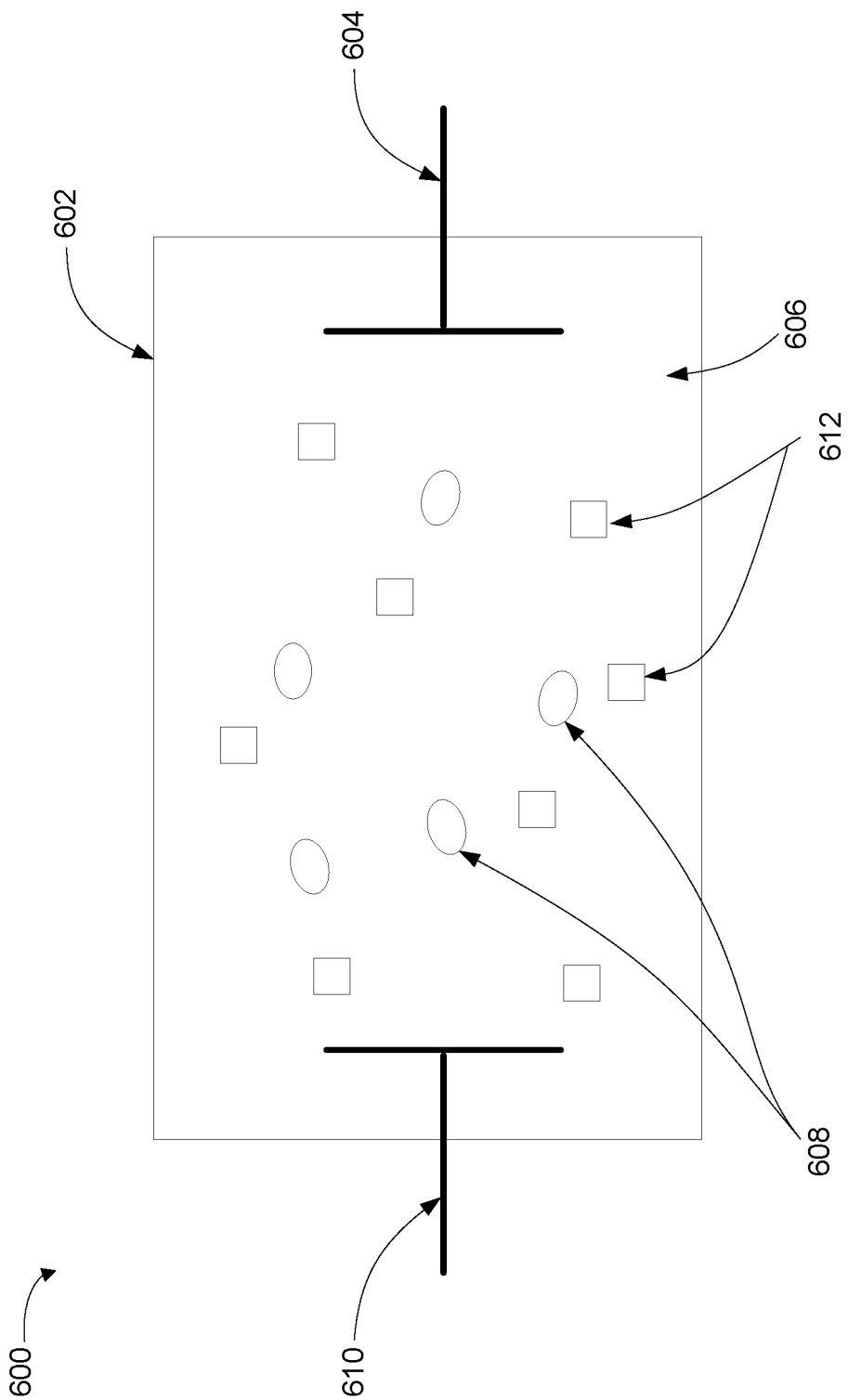
FIG. 6 illustrates another exemplary electrochemical device.

FIG. 6 illustrates an exemplary electrochemical device (600). The electrochemical device (600) comprises, an ionically conducting catholyte (606) comprising one or more salts (612) and a solution of one or more compressed gas catholytes (608), wherein each compressed gas catholyte (608) is in one of a liquid only phase and a combined gas phase and liquid phase, and wherein the solution of one or more compressed gas catholytes (608) has a vapor pressure above an atmospheric pressure at a room temperature. The electrochemical device (600) also includes a housing (602) enclosing the ionically conducting catholyte (606) and structured to provide a pressurized condition to one or more salts (612) and the solution of one or more compressed gas catholytes (608), and an anode electrode (604) and a cathode current collector (610) in contact with the ionically conducting catholyte (606).

Electrochemical capacitors and Li-ion batteries have seen little change in their electrolyte chemistry since their commercialization, which has limited improvements in device performance. Combining superior physical and chemical properties and a high dielectric-fluidity factor, the use of electrolytes based on solvent systems that use components that are typically gaseous under standard conditions show a wide potential window of stability and excellent performance over an extended temperature range. Electrochemical capacitors using difluoromethane show outstanding performance from −78 to +65° C. with an increased operation voltage. The use of fluoromethane shows a high coulombic efficiency of about 97% for cycling lithium metal anodes, together with good cyclability of a 4 V lithium cobalt oxide cathode and operation as low as −60° C. with excellent capacity retention.

Electrochemical energy storage devices, such as electrochemical capacitors and batteries, are used in everything from communications to transportation. A substantial increase in the energy density is achieved for aqueous-based electrolytes through the development and use of electrolytes based on organic solvents that allowed for operation at higher voltages. While the majority of electrolyte work remains with liquid solvents and solid electrolyte systems, there has been very little work using electrolyte solvents that are typically gaseous under standard conditions. While not used as an electrolyte, sulfur dioxide ($T_b=-10°$ C.) and sulfuryl chloride fluoride ($T_b=+7.1°$ C.) have been used as catholytes in non-rechargeable primary lithium batteries; however, both use additional co-solvents in the electrolyte that are liquid at room temperature. Further, ammonia ($T_b=-33.3°$ C.) can be used as a liquid anode due to its ability to solvate alkali metals.

It is often assumed that materials that are gaseous at room temperature are typically non-polar and have low intermolecular attraction, which prevents them from condensing at room temperature or even solubilizing salts in a cooled, or pressurized, liquid state. While this may be true in general, there are a number of reasonably polar molecules which show low London dispersion forces due to their small molecular size and are gaseous at room temperature. For instance, the dielectric constant of dichloromethane ($\varepsilon_{DCM, 20°C.}=8.9$, $T_b=+40°$ C.) is substantially lower than that of structurally similar difluoromethane ($\varepsilon_{DCM, 20°C.}=14.2$, $T_b=-52°$ C.), although at room temperature the former is a liquid while the latter is a gas. At low temperatures or with moderate pressures, these types of polar gasses may be liquefied and have been shown to be capable of solubilizing salts to form liquefied gas electrolytes, in which ion transport, redox phenomena and other fundamental studies have been conducted.

The use of liquefied gas electrolyte systems exclusively composed of solvents which are gaseous at room temperature and atmospheric pressure in rechargeable energy storage systems is explored. Although a number of potential liquefied gas solvents are evaluated, efforts are focused on hydrofluorocarbons, which have moderate dielectric constants that allows for the solubility of salts to form conductive electrolytes. These electrolytes show ultra-low-temperature operation, increased energy density in electrochemical capacitors and high lithium plating and stripping efficiency for potential use of the high-capacity lithium metal anode in batteries. It should be cautioned that while the hydrofluorocarbon solvents themselves are generally non-toxic, they do range from non-flammable to highly flammable, and combustion products may be toxic to humans. Further, these solvents do exhibit a low to high global warming potential. As such, these materials should be handled properly, with additional information provided in supplementary text.

Physical and Chemical Properties of Liquefied Gas Solvents

Figure 14:
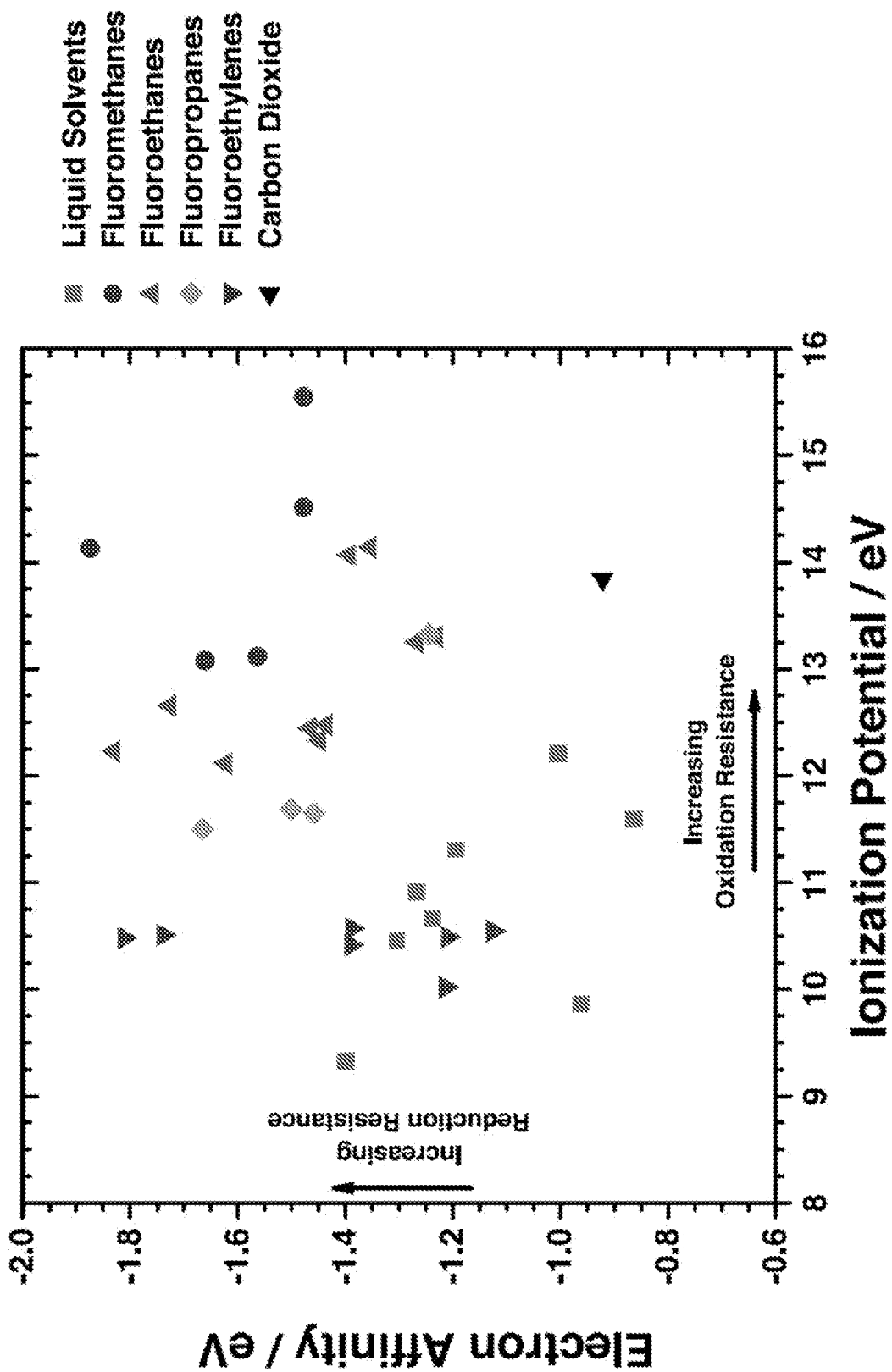
FIG. 14 illustrates ionization potential and electron affinity of liquefied gas solvents.

The electrochemical stability for a range of liquid and liquefied gas solvents was qualitatively estimated by calculating the ionization potential and electron affinity of the solvents, shown in FIG. 14 and Table 1A. FIG. 14 shows ionization potential and electron affinity of liquefied gas solvents. Values for the ionization potential and electron affinity of various groups of solvents as calculated by DFT and tabulated in Table 1A.

Table 1A shows the ionization potential and electron affinity of liquefied gas solvents. Values for the ionization potential (IP) and electron affinity (EA) of various groups of solvents were calculated by DFT.

TABLE 1A

| | Solvent | IP/eV | EA/eV |
|---|---|---|---|
| Liquid Solvents | Acetonitrile | 12.21 | −1.00 |
| | Diethyl Carbonate | 10.46 | −1.30 |
| | Dimethyl Carbonate | 10.91 | −1.27 |
| | Ethyl Methyl Carbonate | 10.66 | −1.24 |
| | Ethylene Carbonate | 11.31 | −1.19 |
| | Fluoroethylene Carbonate | 11.60 | −0.86 |
| | Tetrahydrofuran | 9.33 | −1.40 |
| | Vinylene Carbonate | 9.86 | −0.96 |
| Fluoromethanes | $CH_4$ | 14.13 | −1.87 |
| | $CH_3F$ | 13.08 | −1.66 |
| | $CH_2F_2$ | 13.12 | −1.56 |
| | $CHF_3$ | 14.52 | −1.48 |
| | $CF_4$ | 15.55 | −1.48 |
| Fluoroethanes | $C_2H_6$ | 12.23 | −1.83 |
| | $C_2H_5F$ | 12.12 | −1.62 |
| | $1,1\text{-}C_2H_4F_2$ | 12.45 | −1.47 |
| | $1,2\text{-}C_2H_4F_2$ | 12.33 | −1.45 |
| | $1,1,1\text{-}C_2H_3F_3$ | 14.14 | −1.35 |
| | $1,1,2\text{-}C_2H_3F_3$ | 12.48 | −1.44 |
| | $1,1,1,2\text{-}C_2H_2F_4$ | 13.25 | −1.27 |
| | $1,1,2,2\text{-}C_2H_2F_4$ | 12.66 | −1.73 |
| | $1,1,1,2,2\text{-}C_2HF_5$ | 13.30 | −1.23 |
| | $C_2F_6$ | 14.07 | −1.39 |
| Fluoropropanes | $C_3H_8$ | 11.50 | −1.66 |
| | $CH_2FCH_2CH_3$ | 11.69 | −1.50 |
| | $CH_3CHFCH_3$ | 11.65 | −1.46 |
| | $C_3F_8$ | 13.33 | −1.24 |
| Fluoroethylenes | $C_2H_4$ | 10.51 | −1.74 |
| | $C_2H_3F$ | 10.48 | −1.81 |
| | $1,1\text{-}C_2H_2F_2$ | 10.57 | −1.39 |
| | $1,2\text{-cis-}C_2H_2F_2$ | 10.02 | −1.21 |
| | $1,2\text{-trans-}C_2H_2F_2$ | 10.42 | −1.39 |
| | $C_2HF_3$ | 10.49 | −1.21 |
| | $C_2F_4$ | 10.55 | −1.13 |
| Carbon Dioxide | $CO_2$ | 13.84 | −0.92 |

Selecting from the solvents with optimal electrochemical stability and polarity, six promising liquefied gas solvents are identified and are compared with conventional liquid solvents in FIG. 8A. FIG. 8A illustrates the DFT calculated ionization potentials and electron affinities. Liquefied gas solvents include: fluoromethane (FM), difluoromethane (DFM), fluoroethane (FE), 1,1-difluoroethane (1,1-DFE), 1,1,1,2-tetrafluoroethane (1,1,1,2-TFE), 2 fluoropropane (2-FP). Liquid solvents:acetonitrile (ACN), propylene carbonate (PC), dichloromethane (DCM), tetrahydrofuran (THF), dimethyl carbonate (DMC), diethyl carbonate (DEC), ethyl methyl carbonate (EMC), ethylene carbonate (EC), vinyl carbonate (VC), fluoroethylene carbonate (FEC). In general, these liquefied gas solvents show improved oxidation and reduction resistance compared to conventional solvents. In particular, these calculations suggest fluoromethane (FM) and difluoromethane (DFM) would have improved electrochemical stability over tetrahydrofuran (THF) and ethylene carbonate (EC), which are known for their high stability at highly reductive and oxidative potentials, respectively. FIG. 8B illustrates the electrostatic potential maps. Electrostatic potential maps are overlaid on the physical structures of these solvents for comparison in FIG. 8B, which may be used as a tool to qualitatively determine electrochemical reduction stability of solvents. The regions of highest electrostatic potential (bluest regions) have potential increases in the order of THF<FM<DFM<EC, which correlates well to the high electrochemical reduction stability of THF and indicates FM should similarly have good reduction stability. The regions of lowest electrostatic potential (reddest regions) have potential increases in the order of EC<THF<FM<DFM, which correlates well with the high solubility for the relatively small Li+ cation in EC and THF and indicates that the solubility would be better in FM than in DFM.

Figure 15:
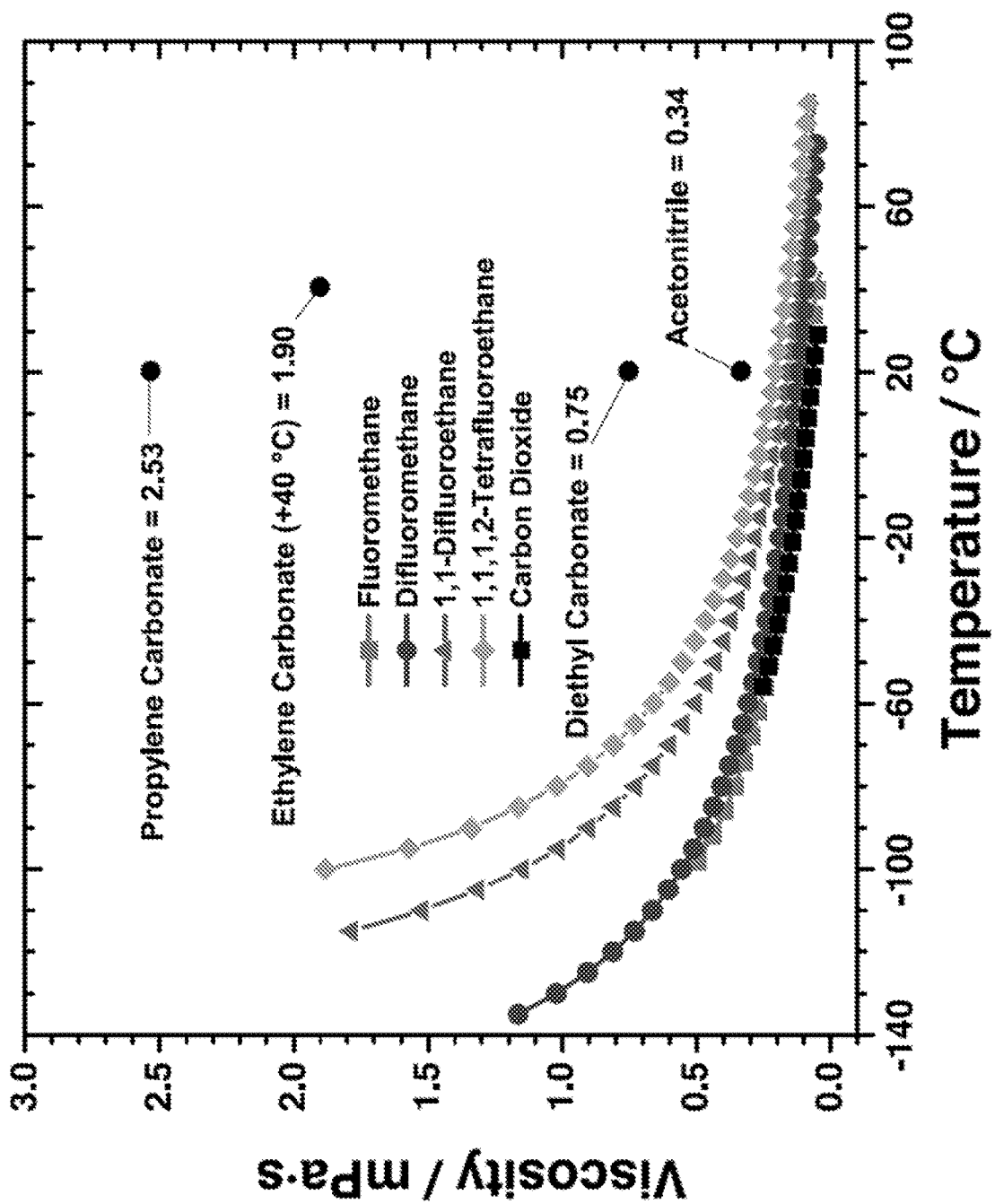
FIG. 15 illustrates viscosity of liquefied gas solvents.

The dielectric constant of the gaseous solvents (ca. $\varepsilon=10~15$) is significantly lower than conventional liquid solvents, which may limit their ability to solubilize various salts. However, the room temperature viscosities of the liquefied gas solvents are also significantly lower than that of conventional liquid solvents. These properties for the liquefied gas solvents fluoromethane and difluoromethane are compared in FIG. 8C. FIG. 8C illustrates (C) relative dielectric, viscosity, dielectric-fluidity values. Both fluoromethane and difluoromethane have a liquid viscosity about three times lower than that of acetonitrile, which is commonly used in high-power devices such as electrochemical capacitors. Because of their exceptionally low viscosities, it is expected that the ion mobility is quite high in electrolytes composed of these solvents. As a qualitative measure of the electrolytic conductivity for a range of solvents, the ratio of dielectric constant to viscosity ($\varepsilon_r \cdot \eta^{-1}$), or the solvent dielectric-fluidity factor, is compared in FIG. 8C. It is found that the liquefied gas solvents have a superior dielectric-fluidity factor compared to conventional liquid solvents, including acetonitrile, which generally shows some of the highest electrolytic conductivities. This qualitative comparison- demonstrates that relatively high electrolytic conductivities may be expected in these solvents having only moderate dielectric constants. Further, the viscosities of these solvents remain favorable at very low temperatures, as shown in FIG. 15, which may allow for high electrolytic conductivity at temperatures where conventional solvents may freeze. FIG. 15 shows viscosity of liquefied gas solvents. Viscosity is a function of temperature for select liquefied gas solvents and comparative conventional liquid solvents.

Vapor pressure curves of the six liquefied gas solvents studied over a range of temperatures are moderate and compared in FIG. 8D. FIG. 8D illustrates vapor pressure curves with a liquid range of various conventional and liquefied gas solvents. Of the solvents studied, fluoromethane and difluoromethane have the highest vapor pressures of 3.8 and 1.8 MPa, respectively, at +25° C. The melting points for each of the solvents are below −100° C. While the boiling points of these solvents are all below room temperature, the present study utilizes these solvents while they are liquefied under their own vapor pressure in a hermetically sealed cell, allowing for electrolyte and cell characterization at increased temperatures where the solvent would normally be gaseous. Further, these solvents have fairly accessible super-critical points, as detailed in Table 1B. Having zero surface tension in the super-critical phase, these solvents may provide additional advantages, such as superior wetting or access to nano pores in high surface area electrodes.

Table 1B shows physical properties of the liquefied gas electrolytes studied. Vapor pressure, density, relative dielectric and viscosity values are taken as a saturated liquid at +20° C. under saturated vapor pressure, except where noted.

TABLE 1B

| Solvent | Structure | $T_m$ °C. | $T_b$ °C. | $T_c$ °C. | $P_c$ MPa | Vapor Pressure MPa | M Wt. g·mol$^{-1}$ | Density g·cc$^{-1}$ | Dipole debye | Relative Dielectric | Viscosity mPa·s | $\varepsilon_r \cdot \eta^{-1}$ (mPa·s)$^{-1}$ |
|---|---|---|---|---|---|---|---|---|---|---|---|---|
| Fluoromethane | H,H,H,F | −142 | −78 | +44 | 5.90 | 3.41 | 34.03 | 0.599 | 1.85 | 9.7 | 0.085 | 114 |
| Difluoromethane | H,H,F,F | −136 | −52 | +78 | 5.78 | 1.47 | 52.02 | 0.981 | 1.98 | 14.2* | 0.120 | 118 |
| Fluoroethane | H,H,H,H,H,F | −143 | −38 | +102 | 5.01 | 0.79 | 48.06 | 0.707 | 1.94 | — | 0.125 | — |
| 1,1-Difluoroethane | H,H,H,H,F,F | −117 | −24 | +113 | 4.52 | 0.51 | 66.05 | 0.912 | 2.26 | 12.5† | 0.173 | 72 |
| 1,1,1,2-Tetrafluoroethane | H,H,F,F,F,F | −101 | −26 | +101 | 4.06 | 0.57 | 102.03 | 1.225 | 2.06 | 9.7‡ | 0.207 | 47 |
| 2-Fluoropropane | F | −133 | −9 | +143 | 4.20 | 0.18× | 62.09 | 0.969§ | — | — | — | — |

*20° C. and 2 MPa
†24° C.
‡30° C.
§−9.4° C.
×0° C.

Electrolytic Conductivity Measurements

Figure 9A:
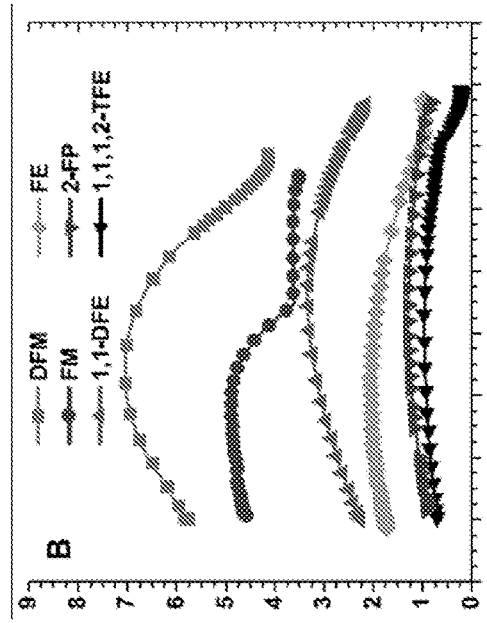
FIGS. 9A-9D illustrate the electrolytic conductivity over temperature of liquefied gas electrolytes.

Electrolytic conductivity measurements of the liquefied gas electrolytes were conducted in order to determine the most promising solvents. Various liquefied gas solvents and salts were tested over a range of temperatures, and it was found that these electrolytes do not follow typical conductivity vs. temperature curves. Generally, the electrolytic conductivity for a liquid electrolyte will scale approximately linearly with increasing temperature, due to decreasing solvent viscosity. However, the liquefied gas electrolytes show three distinct regions of conductivity over a wide range of temperatures, as shown in FIG. 9A for 0.1 M TBAPF$_6$ (tetrabutylammonium hexafluorophosphate) in difluoromethane. FIG. 9A shows 0.1 M TBAPF$_6$ in difluoromethane. The first region at lower temperatures shows the typical increasing conductivity with increasing temperature, which is due to the decreasing viscosity with increasing temperatures ($\eta_{DFM,-60°\ C.}$=0.31 mPa·s, $\eta_{DFM,+20°\ C.}$=0.12 mPa·s). At moderate temperatures, there is a clear maximum, followed by a gradual decrease in conductivity. As the solvent approaches the super-critical point ($T_{c,DFM}$=+78° C.), a drop in conductivity is expected and occurs due to the decreasing dielectric constant lowering the ion mobility ($\varepsilon_{DFM,-57°\ C.}$=28.2, $\varepsilon_{DFM,+°\ C.}$=14.2). While all solvents generally show a decreasing dielectric constant with increasing temperature, the studied solvents already have a comparably low dielectric constant at room temperature and would be susceptible to considerable ion pairing at increasing temperatures. At even higher temperatures, an abrupt change in the conductivity is observed, which separates the second and third regions of the conductivity curve. Because this sharp change occurs at temperatures considerably lower than the super-critical point, any related phenomena are not thought to contribute to this behavior. It was found that this abrupt change in electrolytic conductivity is concurrent with a sudden increase in the pressure of the electrolyte solution, beyond the normal solvent vapor pressure. This phenomenon may be explained by considering the thermal expansion behavior of the solvent. In practice, nearly the entire volume of the measurement cell is filled at a low temperature with liquid solvent, while a small volume remains open, which is naturally filled with gaseous solvent through thermal evaporation. As the temperature increases, the volume of liquid phase increases due to thermal expansion ($\rho_{DFM,-\alpha°\ C.}$=1.24 g·cc$^{-1}$, $\rho_{DFM,+20°\ C.}$=0.98 g·cc$^{-1}$), and the volume of the vapor phase decreases. At an elevated temperature, the thermal expansion of the solvent will cause the liquid phase to occupy the entire volume of the cell and any further increase in temperature will result in an isochoric increase in pressure due to the compression of the liquefied gas electrolyte. It should be cautioned that rather high pressures may be observed if solvent thermal expansion is restricted considerably. An increase in pressure on difluoromethane can increase the dielectric constant of the solvent quite dramatically. Therefore, it may be understood that the abrupt change in electrolytic conductivity in the third region relative to second region of FIG. 9A is due to an improvement in ion mobility from the increased dielectric constant of the solvent, which results from the increased pressure on the electrolyte system. While this pressure-induced effect may be generalized to all electrolytes, it is a particularly significant effect due to the already moderate dielectric constant and high compressibility of this solvent.

Figure 9B:
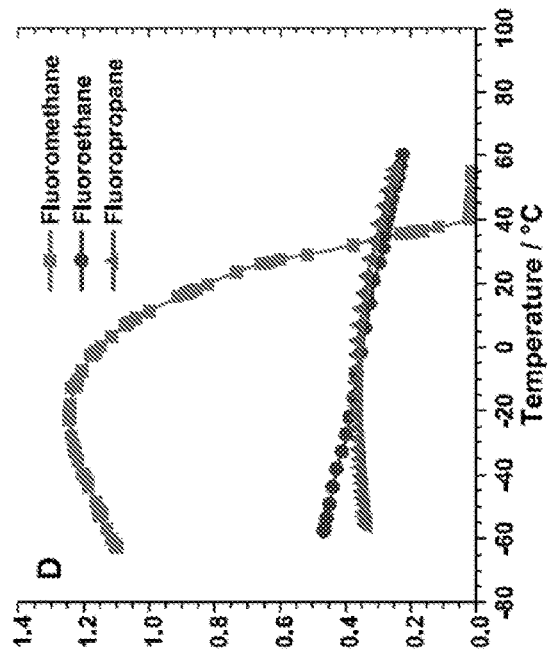
Figure 9C:
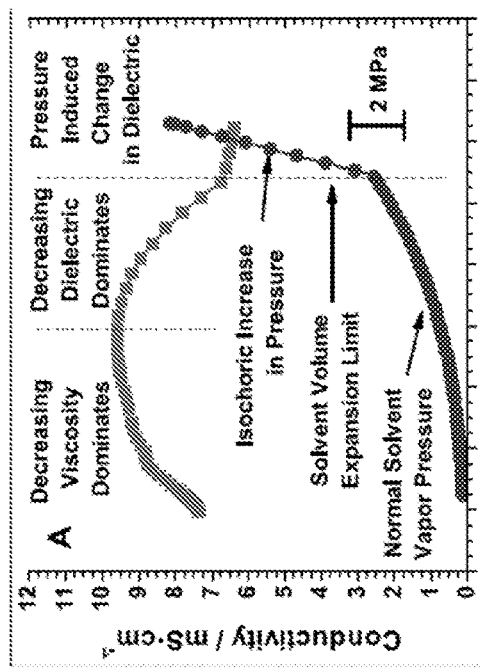
Figure 16:
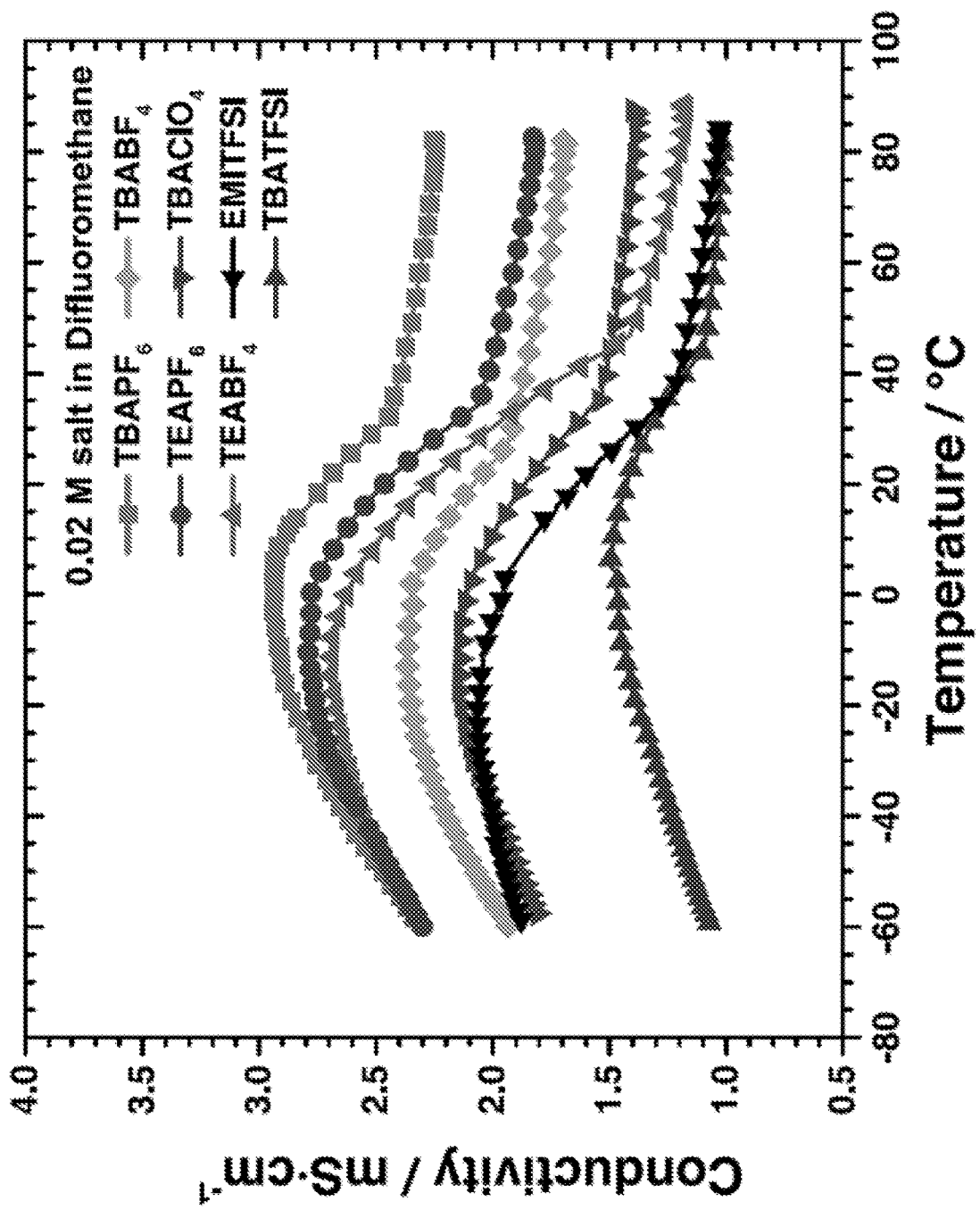
FIG. 16 shows electrolytic conductivity of difluoromethane-based electrolytes.

Similar electrolytic conductivity phenomena may be observed for the other liquefied gas electrolyte systems explored. The electrolytic conductivity of 0.1 M EMITFSI (1-Ethyl-3-methylimidazolium bis(trifluoromethylsulfonyl) imide) in multiple liquefied gas solvents is shown in FIG. 9B and decreased in the order of difluoromethane, fluoromethane, 1,1-difluoroethane, fluoroethane, 2-fluoropropane, and 1,1,1,2-tetrafluoroethane. FIG. 9B shows 0.1 M EMITFSI in various liquefied gas solvents. This follows the order of decreasing dielectric-fluidity factors for the solvents described previously in Table 1B, which gives credibility to the simple qualitative model proposed (the dielectric constants for fluoroethane and 2-fluoropropane were unavailable in the literature). Since difluoromethane was found to exhibit the highest electrolytic conductivity, various salts were tested in this solvent, shown in FIG. 16. FIG. 16 shows electrolytic conductivity of difluoromethane-based electrolytes. Electrolytic conductivity as a function of temperature for various salts in difluoromethane. It was found that TBAPF$_6$ exhibited the highest electrolytic conductivity in difluoromethane, and further studies of this electrolyte system were studied with various concentrations of salt, shown in FIG. 9C. FIG. 9C shows TBAPF$_6$ in difluoromethane at various concentrations. There is a considerable increase in the conductivity of the liquefied gas electrolyte from a concentration of 0.02 to 0.50 M TBAPF$_6$, which shows the salt has good solubility in difluoromethane despite its relatively low dielectric constant. The electrolytic conductivity of the 0.50 M solution shows a maximum conductivity of 31 mS·cm$^{-1}$ at +30° C. More notable, however, is the excellent low-temperature conductivity of 13 mS·cm$^{-1}$ at −60° C. The optimization of binary mixtures of liquid-based solvents with close attention to the conductivity, melting points and potential window has been shown, and a similar electrolytic conductivity at −60° C. for 0.75 M TEABF$_4$ (tetraethylammonium tetrafluoroborate) in acetonitrile:methyl formate 3:1 has been demonstrated; however, the potential window of this electrolyte was limited. FIG. 9C shows that at various concentrations, the conductivity curves exhibit the same general three-regions of electrolytic conductivity across the temperatures measured. A distinct change in the slope of the conductivity curve in the first region, most notably at a concentration of 0.5 M TBAPF$_6$, is thought to be due to increasing ion pairing which is expected to occur in these moderate dielectric solvents with high salt concentrations. There is a gradual change in the temperature separating the second and third regions, which increase from +35° C. to +79° C. from a salt concentration of 0.02 M to 0.5 M. This may be understood by the lower thermal expansion coefficient of the solution with increasing salt concentration, which would require more thermal energy to volumetrically expand and create the isochoric increase in pressure, in turn resulting in the abrupt change in conductivity.

While difluoromethane was shown to have an exceptionally high electrolytic conductivity with many salts, it was found that this solvent was unable to solubilize lithium salts. This is likely due to the steric hindrance of the highly electronegative fluorine atoms of adjacent solvent molecules preventing formation of a solvation shell around the Li$^+$ cation.

Figure 9D:
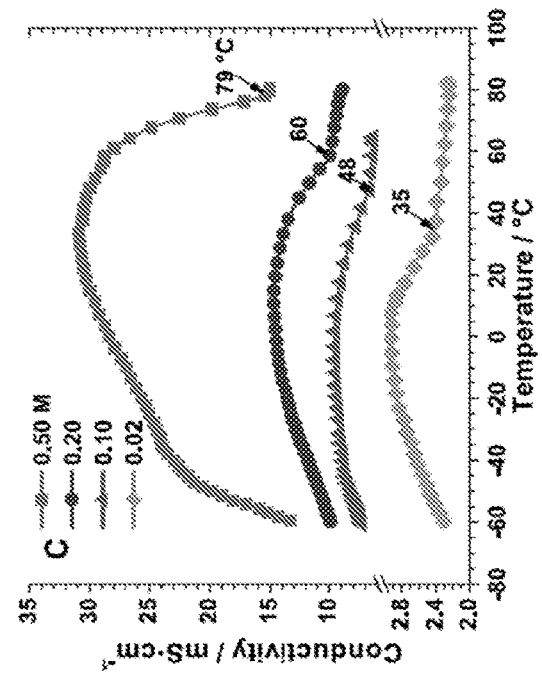

Further work showed that lithium bis(trifluoromethane) sulfonimide (LiTFSI) could only be solubilized in the mono-fluorinated liquefied gas solvents; fluoromethane, fluoroethane, and 2-fluoropropane. This is in agreement with suggestions that these mono-fluorinated solvents have an increased basicity and binding energy to the Li+ cation over difluoromethane and with the previously discussed electrostatic potential maps of the solvents in FIG. 8B. The electrolytic conductivities of these three mono-fluorinated liquefied gas solvents with 0.1 M LiTFSI are compared in FIG. 9D. FIG. 9D shows 0.1 M LiTFSI in various mono-fluorinated liquefied gas solvents. Fluoromethane is shown to have the highest electrolytic conductivity of the three solvents, as is expected from the exceptionally high dielectric-fluidity factor. A maximum conductivity of 1.2 mS·cm$^{-1}$ is seen at −22° C. with an impressive low temperature conductivity of 1.1 mS·cm$^{-1}$ at −60° C. For comparison, a low temperature electrolyte using LiPF6 in a mixture of carbonates and methyl acetate had an electrolytic conductivity of 0.6 mS·cm$^{-1}$ at −60° C., but it had relatively poor performance in a full cell due to the non-ideal solvent system. The electrolytic conductivity at higher concentrations saw little improvement with the LiTFSI salt. At higher temperatures, there is a sudden drop in conductivity, due to the precipitation of the salt out of the electrolyte as fluoromethane reaches its critical temperature ($T_{c,FM}$=+44° C.), which is a useful safety feature among lithium-based electrolytes.

Electrochemical Capacitors

Figures 10A, 10B, 10C:
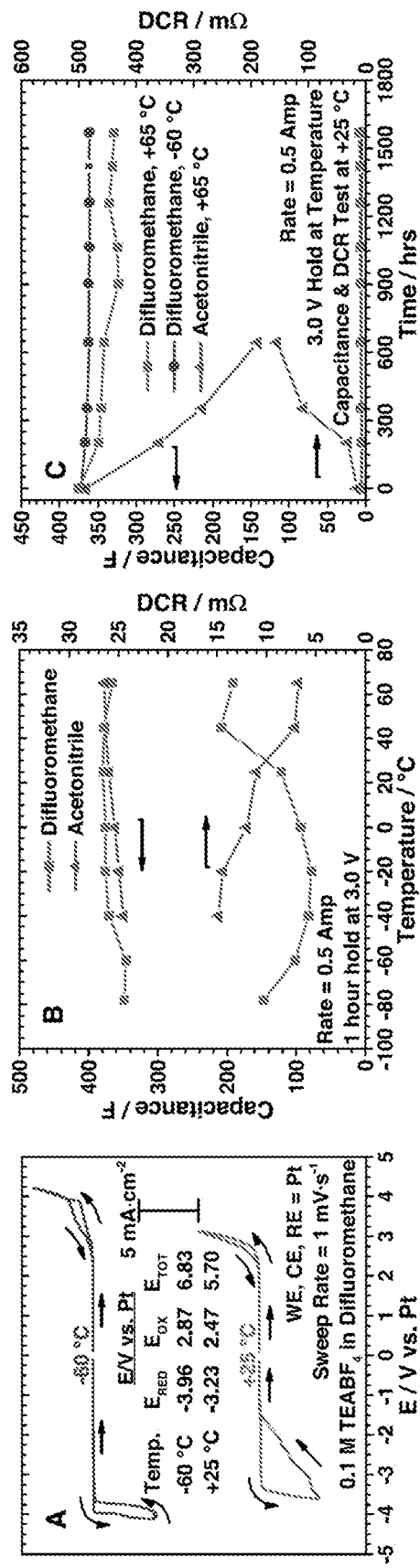
FIGS. 10A-10C illustrate the electrochemical stability of difluoromethane and its use in electrochemical capacitors.

Since difluoromethane shows the highest electrolytic conductivity for non-lithium-based salts, the electrochemical stability of this solvent was studied. FIG. 10A shows the cyclic voltammetry curves for 0.1 M TEABF$_4$ in difluoromethane at both +25° C. and −60° C. FIG. 10A shows cyclic voltammetry curves of 0.1 M TEABF$_4$ in difluoromethane at +25 and −60° C. At +25° C., a potential window of 5.70 V is observed. The positive potential limit of 2.47 V vs. Pt matches well with that of anion oxidation. A significant reduction current is observed with an onset potential of −3.23 V vs. Pt, which results in the continuation of a high reduction current in the reverse sweep direction, possibly due to corrosion of the working electrode. These potential limits are in good agreement with previous results with a similar salt system. At −60° C., the electrolyte shows an impressive electrochemical window of 6.83 V, which is wider than that at +25° C. due to slower chemical kinetics at the decreased temperatures.

Figure 17:
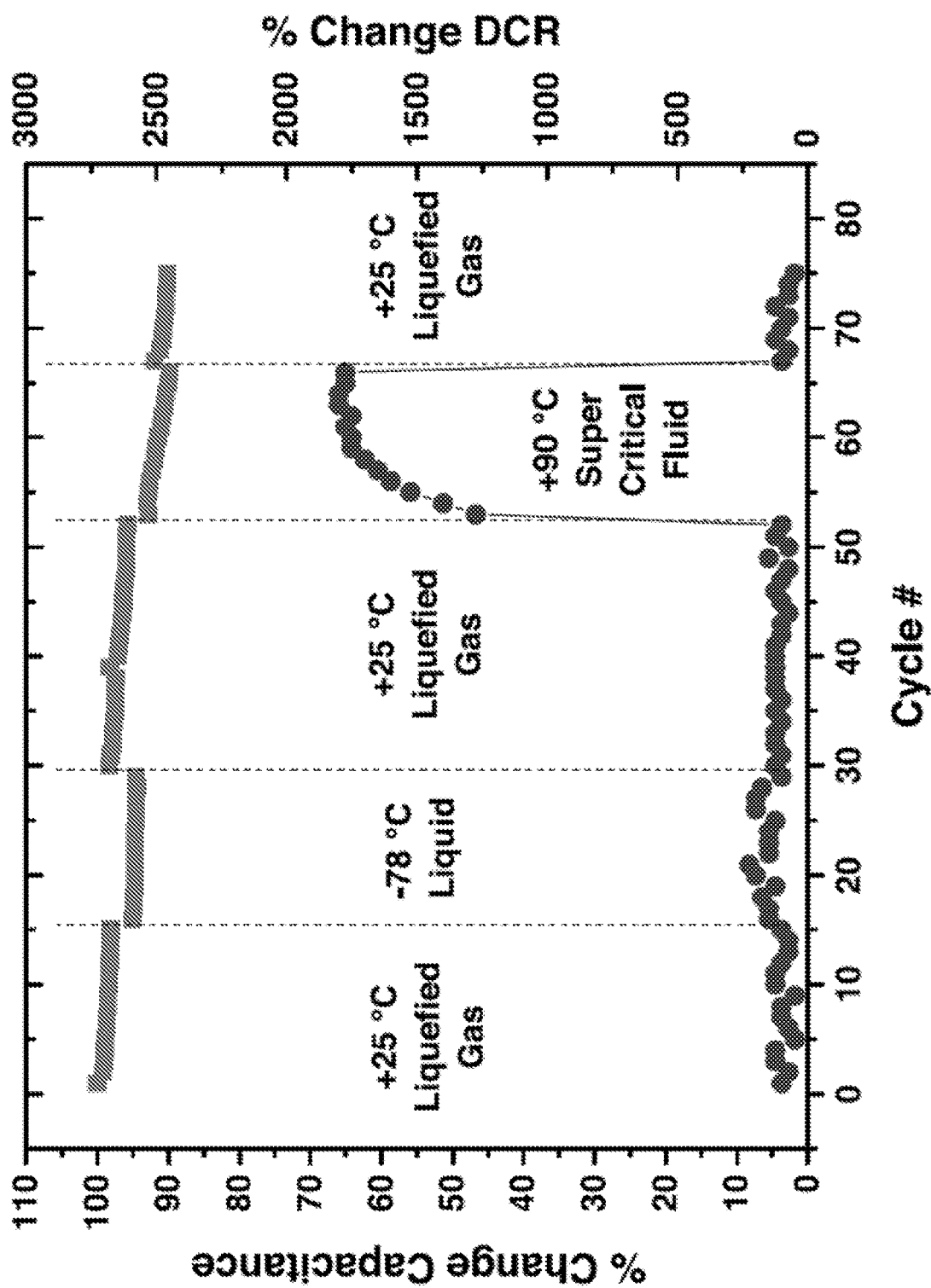
FIG. 17 shows electrochemical capacitor performance.

Commercial electrochemical capacitors of 350 F rated capacitance were tested with 0.5 M TEABF$_4$ in difluoromethane and with a standard liquid electrolyte composed of 1 M TEABF$_4$ in acetonitrile for comparison, both of which were tested under identical mechanical cell conditions and submerged in electrolyte. The capacitance and resistance over a range of temperatures are shown in FIG. 10B. FIG. 10B shows capacitance and resistance measurements of symmetric 350 F electrochemical capacitors using 0.5°M°TEABF$_4$ in difluoromethane and 1 M TEABF$_4$ in acetonitrile over temperatures from −78 to +65° ° C. Capacitance was measured from 2.4 to 1.2° V during a constant current discharge. Resistance was measured via the iR drop between voltage hold and constant current discharge steps. At +25° C., the capacitance for both devices is ca. 375 F and remains fairly constant over the temperature range studied, with only a small decrease to ca. 350 F at low temperatures. The resistance of 8.5 and 11.0 mΩ for the difluoromethane and acetonitrile devices, respectively, at +25° C. emphasizes the high electrolytic conductivity and applicability of the electrolyte to electrochemical capacitors for high power applications. At low temperatures, while the acetonitrile-based device steadily increased in resistance to 14.9 mSΩ at −40° C., just above its freezing point, the difluoromethane based device decreases in resistance to 5.8 mΩ at −20° C. This is in agreement with the electrolytic conductivity measurements, which show a maximum in electrolytic conductivity around this temperature range. At lower temperatures, the resistance slowly increases, yet is still comparable at −78° C. and +25° C., highlighting the excellent low-temperature performance of the electrolyte. This operation temperature is nearly 40° C. lower than commercial acetonitrile-based electrochemical capacitors are rated for and is unsurpassed by other low-temperature electrolyte formulations. At an elevated temperature of +65° C., the resistance increases only slightly to 13.4 mΩ. Device cycling performance was also studied with difluoromethane in the super-critical phase, shown in FIG. 17. FIG. 17 shows electrochemical capacitor performance. Percent change in capacitance and resistance of an electrochemical capacitor over many cycles at various temperatures. Although the capacitance of the device is maintained, there is a substantial increase in electrolyte resistance at +90° C. (ca. 1500% increase) as the salt precipitates out of the solvent due to the decreasing dielectric constant. When the temperature is lowered, the resistance decreases to nominal as the salt is solubilized back into the solution and shows a slight decrease in capacitance due to accelerated cell degradation at the high temperature.

To determine if the novel difluoromethane-based electrolyte offers any advantage in terms of energy density, electrochemical capacitors were tested at an elevated voltage and temperature of 3.0 V and +65° C. for over 1500 hours, shown in FIG. 10C. FIG. 10C shows capacitance and resistance measurements of symmetric 350 F electrochemical capacitors using 0.5°M°TEABF$_4$ in difluoromethane and 1 M TEABF$_4$ in acetonitrile over time with accelerated life testing at 3.0 V at −60 and +65° C. Capacitance was measured from 2.4 to 1.2°V during a constant current discharge. Resistance was measured via the iR drop between voltage hold and constant current discharge steps. The device using the acetonitrile-based electrolyte rapidly fails under these accelerated conditions, showing a substantial increase in resistance and a decrease in capacitance, which agrees with previous studies of electrochemical capacitors under similar conditions. The difluoromethane device, however, shows little decrease in capacitance or increase in resistance under identical conditions. Similarly, a 3.0 V test was carried out at −60° C. to test the low temperature life of the device and shows nearly no change in capacitance or resistance. With a comparable capacitance already demonstrated, the increased voltage rating from 2.7 V (for typical acetonitrile devices) to 3.0 V is equivalent to a 23% increase in energy density, which offers an advantage for a range of electrochemical capacitor applications such as cold engine cranking, start-stop vehicles and hybrid buses.

Rechargeable Lithium Metal Battery

Figure 18:
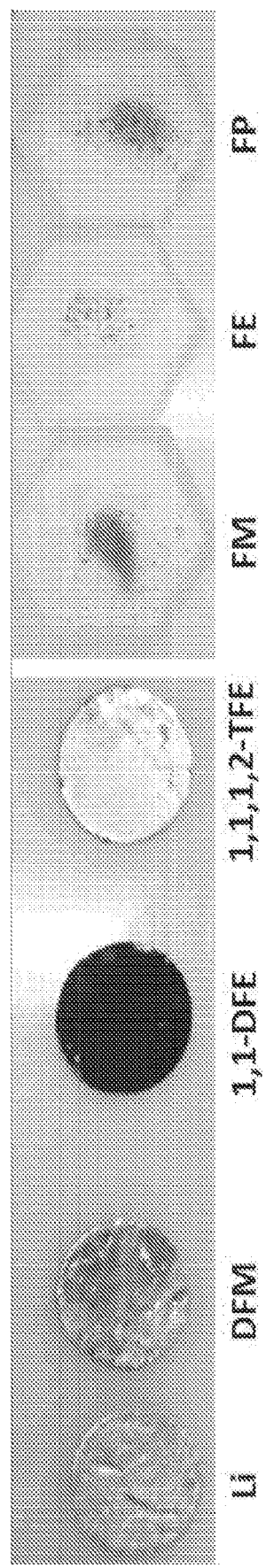
FIG. 18 shows optical images of lithium metal after submersion in liquefied gas solvents.

Due to the high reduction potential of lithium metal (−3.04 V vs. NHE) a thin electrically insulating, but Li-ion conducting, solid electrolyte interphase forms on the lithium metal instantaneously when in contact with many commonly used liquid solvents. Optical images of the resulting chemical products after soaking lithium metal in each of the liquefied gas solvents are shown in FIG. 18. FIG. 18 shows optical images of lithium metal after submersion in liquefied gas solvents. Reaction products as a result of submerging lithium metal in six different liquefied gas solvents, with bare lithium metal (left most image) for comparison. All samples were submerged in a solvent till all chemical reaction activity was seen to cease, times which are tabulated in Table 2. The poly-fluorinated solvents (difluoromethane, difluoroethane and 1,1,1,2-tetrafluoroethane) each form a stable SEI on lithium metal preventing further decomposition of the lithium metal or solvent. Although thorough characterization of these interfaces was not done on these chemical products, the SEI is thought to be significantly made up of various fluoropolymers. The monofluorinated solvents (fluoromethane, fluoroethane, 2-fluoropropane), which are capable of solubilizing lithium salts, each fully decompose lithium metal into a powder form, and no stable SEI is formed. As detailed in Table 2, the reaction time for the full decomposition of lithium metal at room temperature in liquid fluoromethane is significantly slower than in liquid fluoroethane or 2-fluoropropane.

Table 2 shows a lithium metal submersion test results summary. Reactant characteristics resulting from soaking lithium metal in various solvents at +25° C. Lithium metal disks of 0.04 cm thickness and 0.5 cm² were used. Lithium metal was soaked to reaction completion.

TABLE 2

| Solvent | Reaction Product | Approximate Reaction Speed | Product Color |
| --- | --- | --- | --- |
| Fluoromethane | Powder | 20 days | Brown, Purple |
| Difluoromethane | SEI Formation | <1 min | No visible change |
| Fluoroethane | Powder | 2 hours | White, Purple, |
| 1,1-Difluoroethane | SEI Formation | 5 minutes | Gray, Black |
| 1,1,1,2-Tetrafluoroethane | SEI Formation | 1 hour | Gray |
| 2-Fluoropropane | Powder | 3 hours | Purple, Black, |

The chemical reduction of fluoromethane by lithium metal is hypothesized to follow as

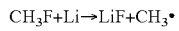

$CH_3F + Li \rightarrow LiF + CH_3\bullet$

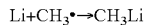

$Li + CH_3\bullet \rightarrow CH_3Li$

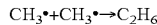

$CH_3\bullet + CH_3\bullet \rightarrow C_2H_6$

Figure 19:
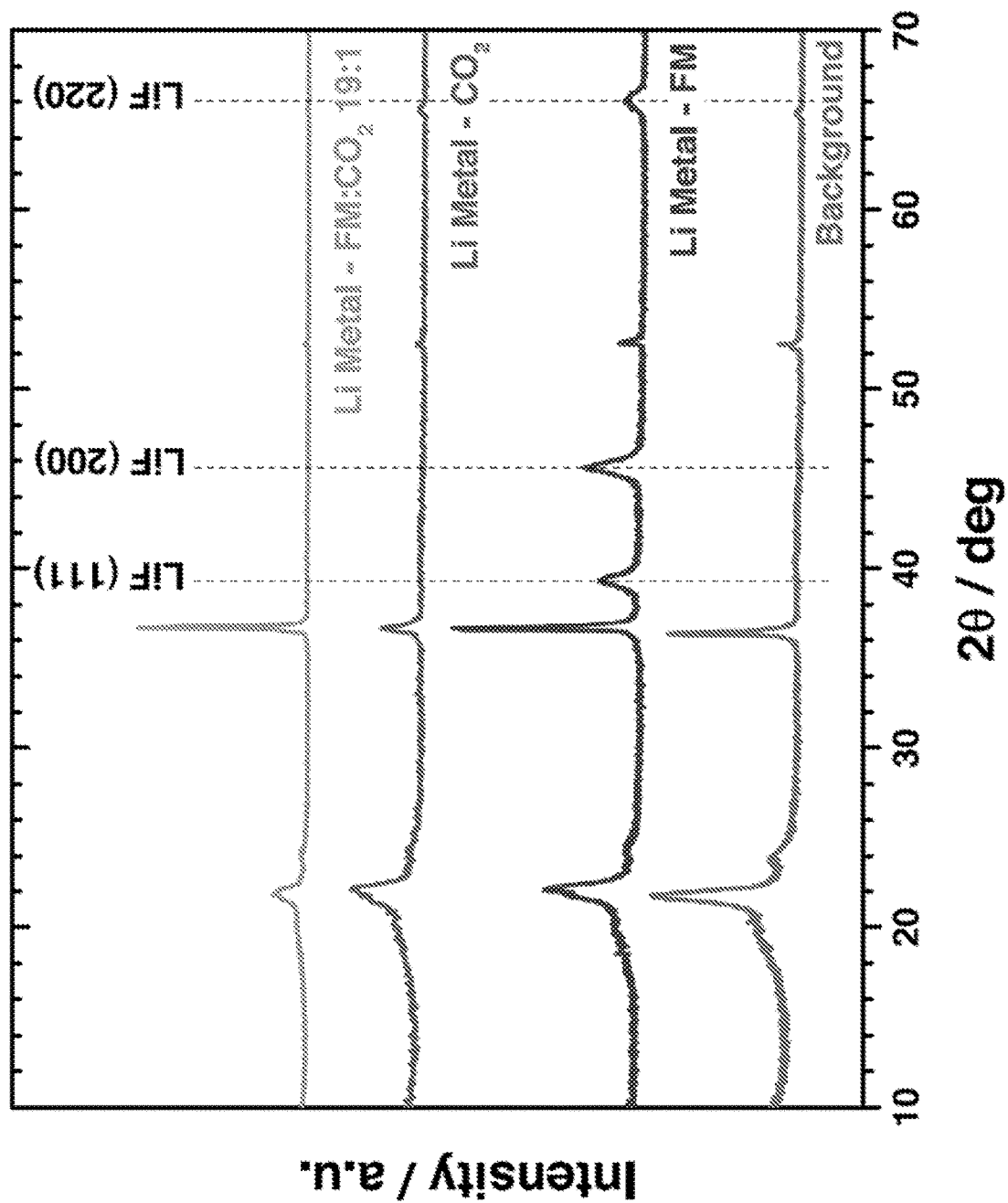
FIG. 19 shows XRD spectra of lithium metal after submersion in liquefied gas solvents.
Figure 20:
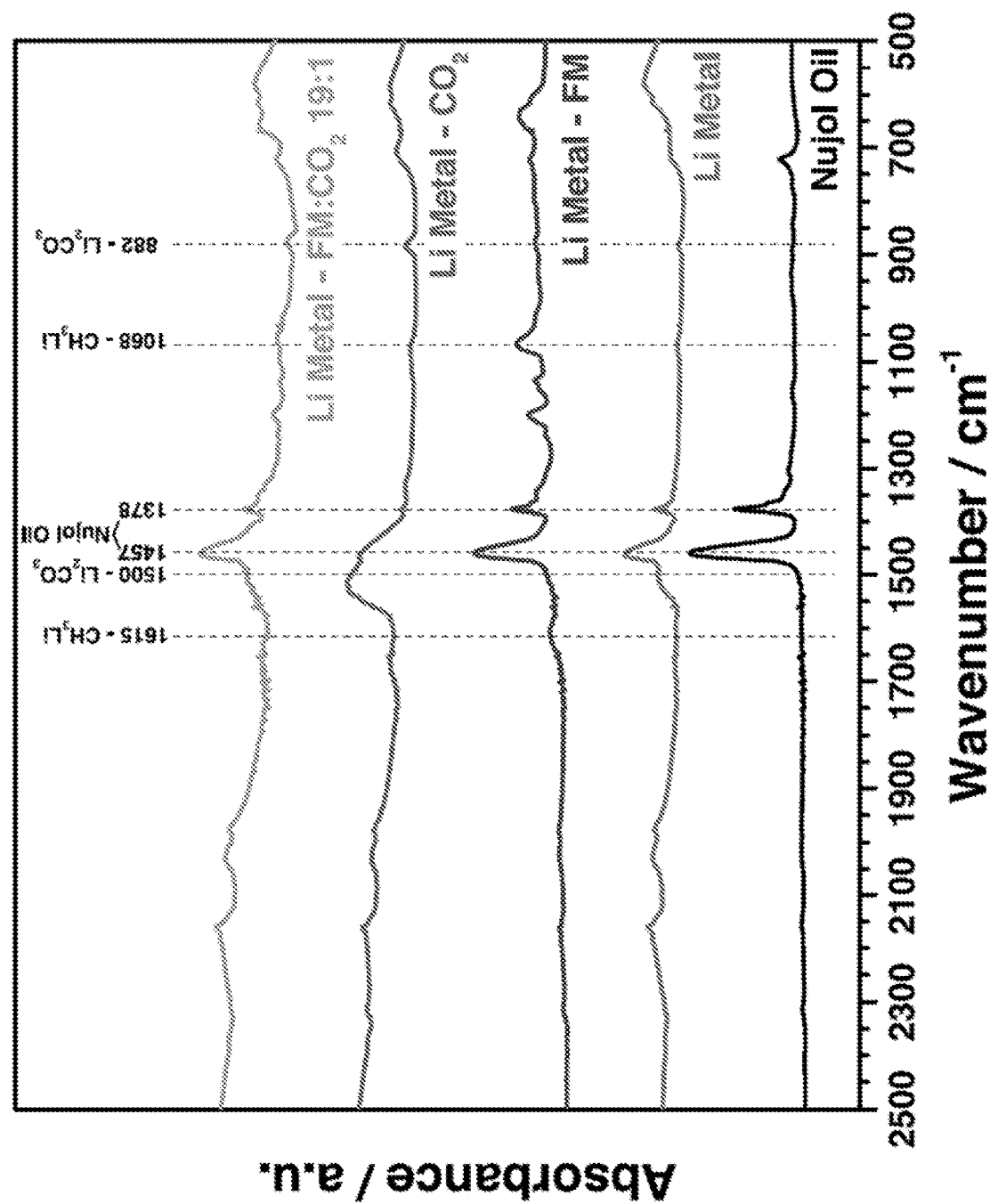
FIG. 20 shows FTIR spectra of lithium metal after submersion in liquefied gas solvents.

Evidence for LiF and CH₃Li among the chemical products is seen in the x-ray diffraction (XRD) and Fourier transform infrared spectroscopy (FTIR) spectra shown in FIG. 19 and FIG. 20, respectively, which supports this reaction scheme. FIG. 19 shows XRD spectra of lithium metal after submersion in liquefied gas solvents. Spectra of lithium metal submerged in fluoromethane, carbon dioxide and a mixture of FM:CO₂ 19:1 after five days. Solvents were all in the liquid state at +25° C. during lithium submersion. FIG. 20 shows the FTIR spectra of lithium metal after submersion in liquefied gas solvents. Spectra of fluoromethane, carbon dioxide and a mixture of FM:CO₂ 19:1 after five days. Solvents were all in the liquid state at 25° C. during lithium submersion. Methyl lithium FTIR peaks have also been identified. Since the kinetics for lithium decomposition in fluoromethane are relatively slow, and it is this solvent which had the highest electrolytic conductivity with lithium salts as seen in FIG. 9D, methods to stabilize the surface of lithium metal were explored. It was found that the use of carbon dioxide in additive amounts in fluoromethane was sufficient to stabilize the lithium surface, due to the creation of a stable lithium carbonate surface layer. The formation of this stable interface is shown in FIG. 19 and 20, which show little evidence for LiF or CH₃Li in the SEI layer on the macroscopic level with the addition of 5 wt % carbon dioxide. Carbon dioxide is an effective additive for use in Li-ion batteries, but solubility in common organic solvents is limited to ca. 0.5 wt % and is strongly dependent on temperature. Conversely, carbon dioxide and fluoromethane are miscible solvents and may enable the use of this highly effective additive in next generation batteries.

Figure 21:
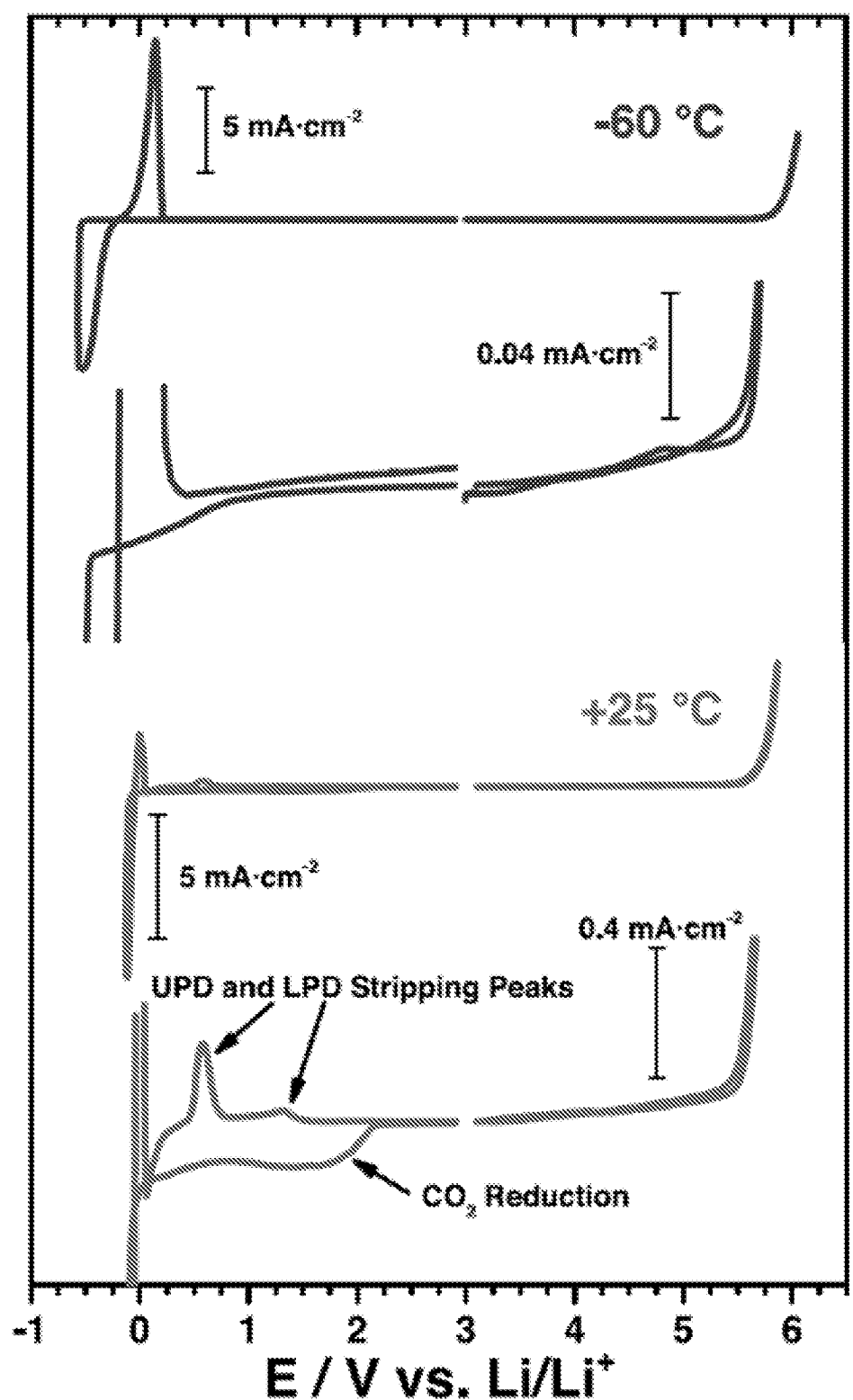
FIG. 21 shows electrochemical stability of fluoromethane.

With the addition of carbon dioxide to form a stable SEI layer on lithium metal, the electrochemical stability of the fluoromethane-based liquefied gas electrolyte was determined by cyclic voltammetry, shown in FIG. 11A and in more detail in FIG. 21. FIG. 11A shows cyclic voltammetry curves of 0.1 M LiTFSI in fluoromethane at +25 and −60° C. with a voltage sweep rate of 1 mV·sec⁻¹, with oxidation potential limit values taken with a 200 μA·cm⁻² cutoff current. FIG. 21 shows electrochemical stability of fluoromethane. Cyclic voltammograms of 0.2 M LiTFSI in FM:CO₂ 19:1. WE=Pt, CE & RE=Li metal, sweep rate=1 mV·sec⁻¹.

The electrolyte is limited by oxidation at 5.57 and 5.79 V vs. Li at +25° C. and −60° C., respectively, which is indicative of slower solvent oxidation kinetics at decreased temperatures. Carbon dioxide reduction is seen to begin at 2.1 V vs. Li, which matches well with the literature. Typical lithium metal plating and stripping peaks are observed to be centered around 0 V vs. Li. While the cathodic upper potential deposition peaks for lithium and platinum alloying are not observed due to concurrent carbon dioxide reduction, two anodic upper deposition potential stripping peaks are observed; a larger peak followed by a smaller peak at 0.58 and 1.32 V vs. Li, respectively. At −60° C., a relatively high over potential for lithium nucleation is also observed, with lithium deposition starting at −0.39 V vs. Li.

Figure 22:
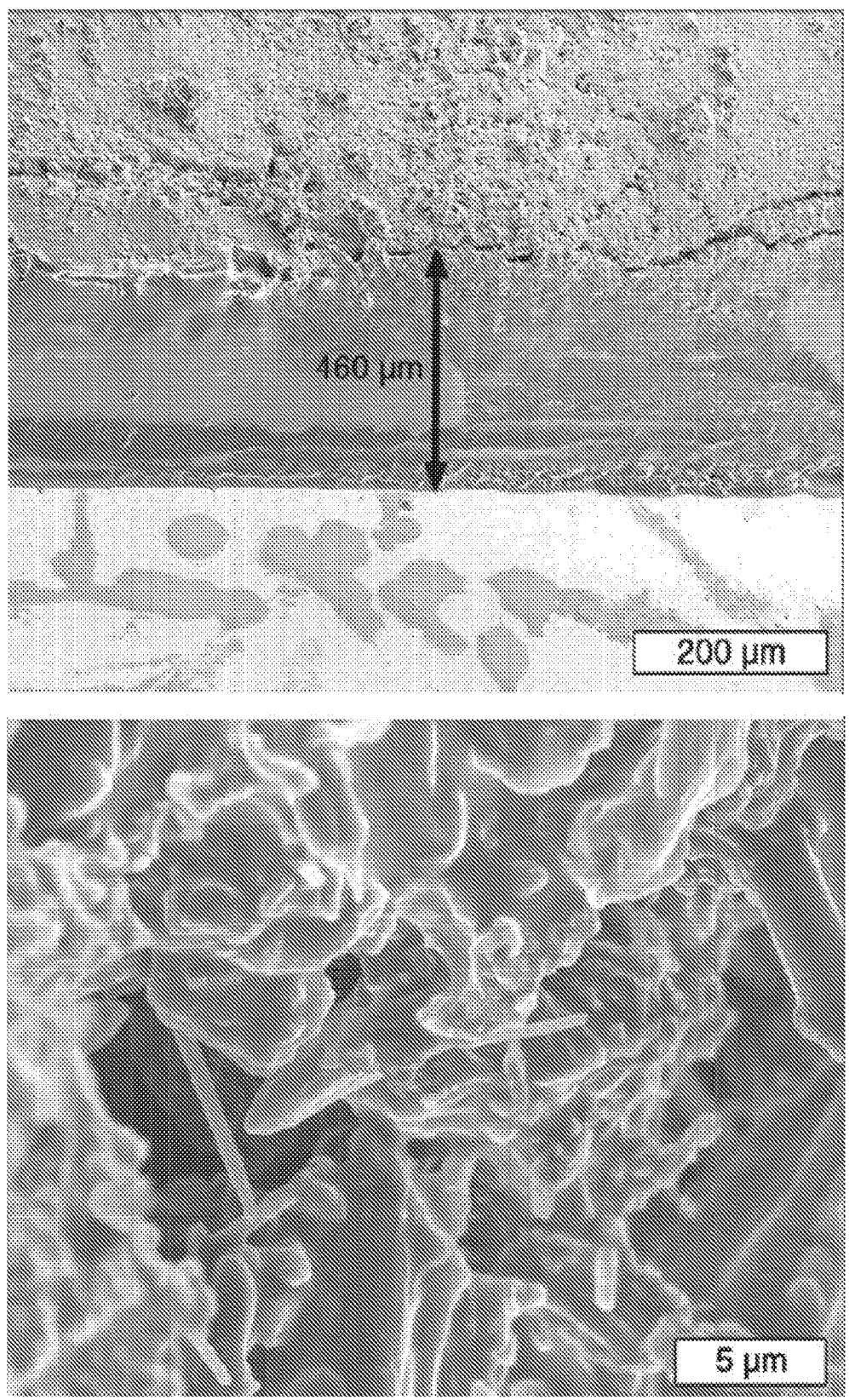
FIG. 22 shows SEM images of lithium plating and stripping in conventional liquid electrolyte.

Lithium metal is known to suffer from poor coulombic efficiency and severe dendrite growth in conventional electrolytes, but because it has the highest gravimetric capacity of all possible anodes (3863 mAh·g⁻¹), there are still numerous efforts to try to enable this anode in a rechargeable battery. Using solvents of low viscosity, increased pressure on the electrode and a surface coverage of LiF are all promising methods to improve the lithium metal anode cyclability and lower the severity of dendrite formation. The exceptionally low viscosity, high vapor pressure and LiF chemical reduction products are all properties inherent to the fluoromethane liquefied gas solvent. To explore the effectiveness of the proposed electrolyte system in enabling the lithium metal anode, the coulombic efficiency of lithium plating and stripping was measured on polished stainless-steel electrodes. As shown in FIG. 11B, the fluoromethane-based electrolyte shows a stable and high coulombic efficiency of ca. 97% over 400 cycles at an aggressive 1 mA·cm⁻² plating and stripping rate with 1 coul·cm⁻² of lithium being passed each cycle. FIG. 11B shows coulombic efficiency of lithium plating and stripping on a SS316L working electrode over 400 cycles using fluoromethane and conventional liquid-based electrolytes at +25° C. For comparison, a conventional liquid electrolyte system (1 M LiPF₆ in EC:DEC 1:1) is shown to have a poor and unstable coulombic efficiency under identical cell conditions. The comparative fluoromethane and liquid electrolyte lithium plating and stripping cells were stopped at 400 cycles to examine the stainless-steel substrates with scanning electron microscopy. The surface morphology of the deposited lithium layer from the fluoromethane-based electrolyte is found to be highly uniform with micron sized grain-like features and no evidence of dendrite growth (FIG. 11C). This is in contrast to the highly polymeric and dendritic like surface observed from cycling in the liquid electrolyte (FIG. 22). FIG. 11C shows SEMs of the fluoromethane SS316L working electrode after the 400 cycles imaged at a 30° tilt in the lithiated state. FIG. 22 shows SEM images of lithium plating and stripping in conventional liquid electrolyte. SEM images of the stainless-steel working electrode used in lithium plating and stripping experiments after 400 lithium plating and stripping cycles were taken in the lithiated state at a 30° angle. Further, the thickness of the deposited lithium layer in the fluoromethane and comparative liquid electrolyte is found to be ca. 60 and 460 μm thick, respectively, reflecting the far superior coulombic efficiency of the novel electrolyte system.

The coulombic efficiency for lithium plating and stripping compares with reported values for diethyl ether:tetrahydrofuran 95:5 (98%) (34), 2-methylfuran (97%) (35), and 1,2-dioxolane (98%) (36). The high efficiencies in these systems are only seen with the use of the toxic lithium hexafluoroarsenate (LiAsF$_6$) salt which is reduced at the lithium metal surface to form a LiF passivation layer. In the fluoromethane system, the solvent itself forms a LiF layer when reduced, which removes the need for LiAsF$_6$ salt. In addition, the reduction of carbon dioxide to form lithium carbonate has been shown to improve the impedance and cyclability of the lithium metal anode, which is used to stabilize the electrode in the present study. More recently, other electrolyte systems have been shown to have high lithium plating and stripping efficiencies without the use of LiAsF$_6$, but none have demonstrated suitable oxidation stability for use with conventional 4 V cathode systems due to the poor stability at increased potentials of these ether-based electrolyte (38). These electrolytes are mostly limited to cathode chemistries, which have a low potential and limit the oxidation of these solvents; however, the ability to use a lithium metal anode with a high voltage intercalation cathode would offer a significant increase in energy density as well.

Figure 7:
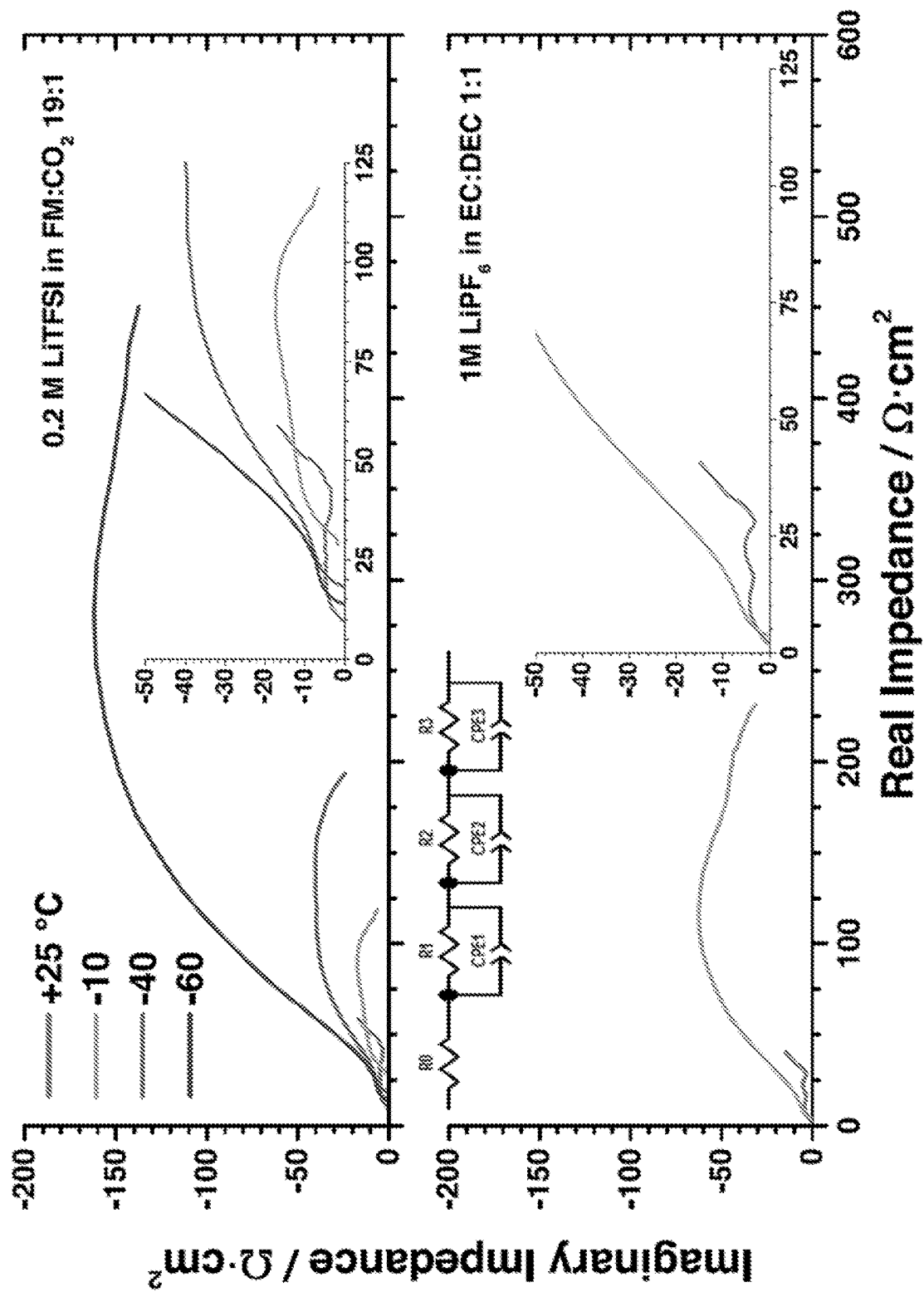
FIG. 7 shows electrochemical impedance spectra of lithium metal LiCoO$_2$ cell.
Figures 11D, 11E, 11F:
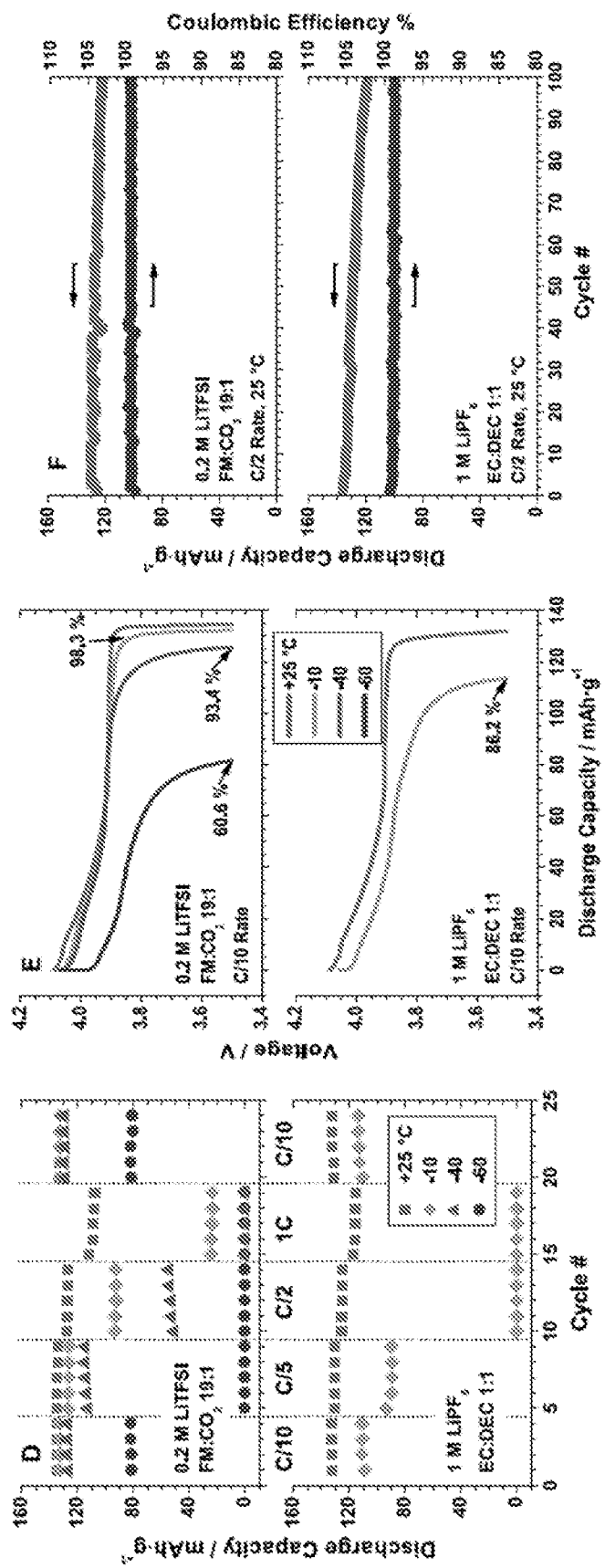

A lithium cobalt oxide (LiCoO$_2$) cathode was used to demonstrate the high oxidation stability and compatibility of the fluoromethane-based liquefied gas electrolyte with traditional cathode materials. Fluoromethane- and conventional liquid-based electrolyte systems were used for comparison to test this cathode under identical cell conditions. All charging and discharging of cells were done at a fixed temperature, rather than charging at a higher temperature followed by discharge at a lower temperature. The electrode performance in both electrolyte systems is shown over a number of cycles at various temperatures and C-rates (FIG. 11D) with corresponding voltage vs. discharge capacity curves (FIG. 11E). FIG. 11D shows discharge capacity over various temperatures and C-rates. And, FIG. 11E shows voltage vs. discharge capacity over various temperatures at the C/10 rate. At +25° C., the discharge capacity at the C/10 rate is very similar, showing ca. 133 mAh·g$^{-1}$ using both electrolytes. At higher rates, the performance of the liquid electrolyte system is marginally higher than the fluoromethane-based electrolyte, showing a capacity retention of 87.2% and 81.2% at the 1C rate, respectively. However, at lower temperatures the high-rate performance of the fluoromethane-based electrolyte is far superior. At −10° C. and at the C/10 rate, the fluoromethane and liquid-based electrolytes show a 98.3% and 86.2% discharge capacity retention relative to +25° C., respectively. At higher rates or lower temperatures, the liquid-based electrolyte fails to cycle properly due to a high cell impedance. In contrast, the cell utilizing the fluoromethane-based electrolyte cycles fairly well at higher rates at various temperatures, most notably showing an excellent capacity retention of 60.6% at the C/10 rate at −60° C. where traditional liquid electrolytes would generally freeze. This compares favorably with a specially developed low-temperature liquid-based electrolyte that shows a discharge capacity retention of 43.5% at the C/10 rate at −60° C. using a significantly larger capacity full cell. Impedance spectra for cells at each temperature are shown in FIG. 7, and fitted parameters are given in Table 3. FIG. 7 shows electrochemical impedance spectra of lithium metal LiCoO$_2$ cell. Electrochemical impedance spectra of cells using LiCoO$_2$ and lithium metal as cathode and anode, respectively, with fluoromethane- (top) and conventional liquid- (bottom) based electrolytes. Spectra taken at a cell voltage of 4.1 V. Fitted impedance data is presented in Table 3. An additional RC circuit at high frequencies was an artifact of the wires and metal contacts submerged in the electrolyte solution due to the unique construction of the high-pressure cells, thus the fitted parameter R1 was held constant for each cell over all temperatures.

Stability of the fluoromethane based electrolyte system is compared to the liquid electrolyte in FIG. 11F at +25° C. and at a C/2 rate. FIG. 11F shows discharge capacity and coulombic efficiency with cycling at the C/2 rate of a LiCoO$_2$ electrode with a lithium metal anode. Both electrolytes show very similar stability, with the fluoromethane-based electrolyte showing a 96.7% capacity retention after 100 cycles, which demonstrates the high compatibility of this electrolyte system with conventional 4 V cathodes.

Table 3 shows impedance spectroscopy fitting parameters for lithium metal LiCoO$_2$ cells. Electrochemical impedance spectroscopy fitting parameters for cells using a lithium metal anode and LiCoO$_2$ cathode in two electrolytes over various temperatures. The fitted circuit and full impedance spectra are shown in FIG. 23.

TABLE 3

| | | Impedance/Ω cm$^2$ | | | |
|---|---|---|---|---|---|
| Electrolyte | Temperature/° C. | R0 | R1 | R2 | R3 |
| 0.2M LiTFSI in FM:CO$_2$ 19:1 | +25 | 9.45 | 10.46 | 0.09 | 21.60 |
| 0.2M LiTFSI in FM:CO$_2$ 19:1 | −10 | 28.50 | 10.46 | 25.10 | 58.40 |
| 0.2M LiTFSI in FM:CO$_2$ 19:1 | −40 | 18.32 | 10.46 | 89.08 | 107.15 |
| 0.2M LiTFSI in FM:CO$_2$ 19:1 | −60 | 13.35 | 10.46 | 579.00 | 124.90 |
| 1M LiPF$_6$ in EC:DEC 1:1 | +25 | 1.84 | 11.10 | 3.03 | 14.36 |
| 1M LiPF$_6$ in EC:DEC 1:1 | −10 | 3.49 | 11.10 | 27.58 | 212.71 |

The low conductivity of traditional liquid electrolytes is not a primary source of the limited low-temperature performance of Li-ion cells. The true origin of these limitations is likely due to charge transfer or solid electrolyte interphase impedance and is sensitive to the type of electrodes and electrolyte used. Because identical anodes and cathodes were used in these studies, it is thought the high performance of the fluoromethane-based electrolyte at such low temperatures is due to the significantly improved SEI layer on the electrodes. To further explore the electrode-electrolyte interphases seen in the fluoromethane-based electrolyte, x-ray photoelectron spectroscopy (XPS) analysis was conducted on both the lithium metal anode and LiCoO$_2$ cathodes. As seen in FIG. 12, the surface of lithium metal submerged in fluoromethane is significantly composed of LiF and CH$_3$Li with a minor Li$_2$CO$_3$ signal originating from impurities within the lithium metal. The addition of carbon dioxide to stabilize the surface further adds a significant Li$_2$CO$_3$ component to the SEI and lowering of the CH$_3$Li component, results which agree with the XRD and FTIR analyses. After cycling, the surface components show little chemical change and retain a highly ceramic-like SEI composed primarily of LiF and Li$_2$CO$_3$, in contrast to the highly polymer-like SEI formed on the surface on lithium metal submerged in conventional carbonate-based electrolytes. The formation of a thin Li$_2$CO$_3$ layer via carbon dioxide reduction and the high mobility of lithium ions through the grain boundaries of the highly ceramic surface are thought to both contribute to a substantially decreased impedance through the anode SEI layer. Further, the highly chemically uniform interface as seen in the fluoromethane-based electrolyte is thought to contribute to a more uniform current distribution, which prevents dendrite formation.

While the improvement on the anode is expected to improve cell performance, previous studies have shown that a significantly higher impedance occurs on the cathode, rather than on the anode, at low temperatures (44). The chemistry of the cathode-electrolyte interphase was examined via XPS, shown in FIG. 13. Comparing the XPS spectra of $LiCoO_2$ electrodes before cycling and after cycling, there are surprising differences. Other than evidence of a small amount of residual LiTFSI salt, there is no change in the Li 1s, C 1s, F1s and Co 2p spectra for the electrode cycled in the fluoromethane-based electrolyte. In contrast, the electrode cycled in the conventional liquid electrolyte shows a significant increase of LiF on the surface of the electrode from decomposition of the $PF_6^-$ anion. While the O is shows the typical increase in polymeric-type species in agreement with other work, the change occurring in the O is spectra of the electrode cycled in the fluoromethane-based electrolyte is not as clear. Since carbon dioxide is expected to be stable at the potentials seen at this electrode surface and there is no other source of oxygen, the increased peak seen in the O 1s spectra is thought to be due to a change of the surface oxygen of the $LiCoO_2$ electrode and not related to the formation of an additional surface layer on the electrode. It is concluded that the improved SEI on lithium metal and a cathode with little or no SEI both contribute to the exceptionally high performance at low temperatures of lithium batteries using these liquefied gas electrolytes.

Conclusion

Through a combination of superior physical and chemical properties, hydrofluorocarbon-based liquefied gas electrolytes are shown to be compatible for energy storage devices. The low melting points and high dielectric-fluidity factors of these liquefied gas solvents allows for exceptionally high electrolytic conductivities over a range of temperatures. High performance in electrochemical capacitors and lithium batteries at temperatures as low as −78° C. and −60° C., respectively, has been demonstrated for potential use in aerospace and high-atmosphere applications. Comparable conductivities and performance to conventional electrolytes at moderate temperatures has also been shown, which may be applicable to more mainstream applications such as hybrid and electric vehicles. With the use of difluoromethane as an electrolyte solvent, electrochemical capacitor operation at an increased voltage under accelerated life conditions has been demonstrated, equating to a 23% increase in energy density. With the use of fluoromethane as an electrolyte solvent, a high coulombic efficiency of ca. 97% for lithium metal plating and stripping with no evidence of dendritic growth as well as the compatibility with the traditional 4 V $LiCoO_2$ cathode offers a promising path towards developing a high energy density rechargeable lithium metal battery.

Materials and Methods

Materials: In one example implementation, Fluoromethane (99.99%) and difluoromethane (99.99%) were obtained from Matheson Gas, fluoroethane (97%), 1,1-difluoroethane (99%), 1,1,1,2-tetrafluoroethane (99%) and 2-fluoropropane (98%) were obtained from Synquest Labs and carbon dioxide (99.9%) was obtained from Airgas. All gases were stored in high pressure refrigerant recovery tanks after use to minimize their release to atmosphere. The salts tetraethylammonium hexafluorophosphate (99.9%) and lithium bis (trifluoromethane)sulfonimide (99.9%) were purchased from BASF while all other salts (electrochemical grade) and acetonitrile (99.8%, anhydrous) were purchased from Sigma-Aldrich. For comparative studies, a liquid electrolyte composed of 1 M $LiPF_6$ in EC:DEC 1:1 by wt % was used (LP40, BASF). Dimethyl carbonate (>99%, anhydrous) and Nujol Oil for FTIR measurements was purchased from Sigma-Aldrich. Acetonitrile and dimethyl carbonate were dried over molecular sieves prior to use, while all other materials were used as received.

In one example implementation, for lithium battery electrodes, lithium cobalt oxide, carbon black, and lithium metal were purchased from Sigma-Aldrich, Timcal, and FMC, respectively. In lithium battery and lithium platting and stripping experiments, electrodes were electrically separated by a single porous 20 μm polypropylene separator (Celgard 2075). Commercial electrochemical capacitor jelly rolls (350 F rated) were donated from Maxwell Technologies, which had no prior contact with any electrolyte solution.

Electrolytic Conductivity Measurements

Electrolytic conductivity measurements were performed. Briefly, four electrode electrolytic conductivity measurements were performed with a custom fabricated thin-film platinum sputtered electrode on borosilicate glass. The cell constant was calibrated from 0.1 to 100 $mS·cm^{-1}$ with a measurement accuracy of ±6%. The thin film electrode ensured there would be no geometric change, and hence cell-constant change, under the increased pressures resulting from the studied electrolytes.

Electrochemical Capacitors

For electrochemical capacitor testing, jelly rolls were dried overnight under vacuum at +180° C. Custom cells were designed to make four-wire measurements to the jelly roll in order to obtain accurate resistance measurements. All metal contacts were made of aluminum to avoid corrosion issues during cell test. Cell assembly was all done under argon atmosphere.

Resistance (DCR) measurements were calculated from the instantaneous iR drop (captured on a high resolution potentiostat) resulting from a 0.5 Amp discharge current after holding at 3 V for 1 hour. Capacitance was measured as $$Capacitance = I·(t_2-t_1)/(V_2-V_1)$$

where I, $V_2$ and $V_1$ were set at −0.5 Amp, 2.4 and 1.2 V, respectively.

Rechargeable Lithium Metal Battery

For rechargeable lithium metal battery testing, electrode slurries composed of $LiCoO_2$:carbon black:PVDF binder at a 8:1:1 ratio by weight were mixed with an appropriate amount of N-Methyl-2-pyrrolidone (NMP) solvent and doctor bladed onto 25 μm thick stainless steel 316L foil. The thickness of the coated active electrode after cold calendaring was ca. 40 μm thick. Active mass loading was ca. 0.9 $mAh·cm^{-2}$ or 6.6 $mg·cm^{-2}$ (assuming a theoretical capacity of 137 $mAh·g^{-1}$ when cycled between 3.5 and 4.1 V). Electrodes of 0.31 $cm^2$ were used for cell testing. Lithium metal was purchased from FMC and was scraped clean with a glass slide and rolled with a polyethylene rod to a mirror finish prior to all experiments. Electrodes were electrically separated by a single porous 20 μm polypropylene separator and placed inside a custom fabricated coin cell constructed of high-density polyethylene equipped with stainless steel 316L current collectors for both electrodes. All cell assembly was done under an argon atmosphere.

For lithium plating and stripping coulombic efficiency tests, cells were similarly prepared, except that the $LiCoO_2$ electrode was not used and lithium was directly plated to the stainless-steel 316L current collectors, used here as working electrodes, which were polished to a mirror finish. In all tests, all wetted metal components were stainless steel 316 to avoid corrosion issues.

Electrolyte Addition

In an exemplary embodiment, to form the liquefied gas electrolyte solution, a predetermined weighed amount of salt was first pre-loaded into a high-pressure cell, such as a stainless-steel cell, along with the capacitor or battery device, such a pair of electrodes, and sealed under argon atmosphere. The predetermined weighed amount of salt may be determined based on the volume of the compressed gas solvent and the concentration of the salt. For example, for a 0.2 M solution for a 2-liter volume of compressed gas solvent, 0.2 moles of salt would be required, where 1 mole is equivalent to $6.022 \times 10^{23}$ molecules. The cells were then cooled to a temperature below the temperature of a source of the compressed gas solvent. A controlled amount of solvent was allowed to evaporate from the source and condense into the cell using either a mass flow controller (MKS) or a mass flow meter through a tube connected to the cell, which was then sealed shut. In some embodiments, the cell is sealed shut using an attached valve. In some other embodiments, the cell is sealed shut using either a plug or a welded cover. A controlled amount of solvent may be selected to dilute the salt to a predetermined concentration, such as 0.2M LiTFSI. For comparative studies, conventional liquid electrolytes were added under argon atmosphere prior to cell sealing. Cells for comparative study using liquid electrolytes were otherwise mechanically identical to the liquefied gas electrolyte-based cells and electrodes were similarly submerged under electrolyte solution.

Thermal and Electrochemical Characterization

For thermal testing, cells were allowed to thermally equilibrate inside a temperature chamber (Espec) before beginning test. Dry ice was used to cool the cells for tests conducted at −78° C. Temperature measurements were made from a Type K thermocouple with an uncertainty of ±2° C. and pressure measurements were recorded from a digital pressure transducer (Omega Engineering) with an uncertainty of ±2% of the measured pressure. Temperature and pressure measurements were recorded with a digital data acquisition system (Agilent).

All electrochemical tests were conducted inside high-pressure stainless-steel cells equipped with electrical feed-throughs which were electrically connected to test electrodes. Cyclic voltammetry experiments were performed with a sweep rate of 1 mV·sec$^{-1}$. Non-lithium-based electrolytes used sputtered platinum counter and reference electrodes.

Lithium-based electrolytes used lithium metal counter and reference electrodes. All electrolytes used sputtered platinum working electrodes with an area of 1 mm$^2$ (exposed area defined by a ca. 250 nm thick silicon dioxide passivation layer) on borosilicate glass. Separate platinum working electrodes were used for anodic and cathodic potential regions as well as for each temperature to avoid effects from a previous polarization of the working electrode. Potential windows were calculated at the point where current increased beyond 200 µA·cm$^{-2}$. Battery electrochemical impedance measurements were conducted with a sinusoidal probe voltage of 5 mV and spectra were fitted with ZView software. All electrochemical capacitor cycling, cyclic voltammetry and impedance measurements were conducted with an SP-200 potentiostat (Bio-Logic).

Lithium battery cell cycling was performed with a battery cycler (Arbin). For LiCoO$_2$ cell tests, cycling consisted of a 100% depth of discharge from 3.5 to 4.1 V for all measurements. For lithium platting and stripping experiments, a single cycle consisted of plating lithium metal to the polished stainless steel 316L working electrode at a current density of 1 mA·cm$^{-2}$ with a total charge transfer of 1 coul·cm$^{-2}$, followed by lithium stripping at 1 mA·cm$^{-2}$ till the working electrode potential rose above 1 V vs. Li/Li+, at which point the current was immediately reversed and the following cycle commenced. The coulombic efficiency was simply calculated as Efficiency %=100·($Q_{strip}$)·($Q_{plate}$)$^{-1}$ where $Q_{strip}$ is the amount of charge passed during the lithium stripping cycle, and $Q_{plate}$ is the amount of charge plated (1 coul·cm$^{-2}$) each cycle.

Materials Characterization

Powder x-ray diffractions (XRD) of samples were collected on either a Bruker D8 or a Bruker D2 Phaser using Cu Kα radiation. Continuous scanning of a detector covering angles from 10.0° to 80.0° with a scan rate of ca. 0.02° s$^{-1}$ and wavelength of λ=0.154 nm. Air sensitive samples were sealed under argon atmosphere in polyethylene heat sealed bags, and their backgrounds are included in the XRD background spectra.

Fourier transform infrared (FTIR) measurements were conducted with a liquid nitrogen cooled Nicolet 6700 Analytical MCT FT-IR Spectrometer using an Attenuated Total Reflectance (ATR) accessory (single bounce, Diamond/ZnSe crystal). For lithium metal measurements, samples were submerged into Nujol Mineral oil under an argon atmosphere. The samples were then transferred in a sealed vial then quickly clamped down with a polyethylene plastic backing onto the ATR crystal. This allowed Nujol oil to spread around the sample, protecting it from the atmosphere. Measurements over several minutes were made to ensure that there was no change in FTIR spectra due to atmospheric reaction.

Scanning electron microscopy images were taken on a FEI XL30 SFEG equipped with Ultra High Resolution (UHR) scanning mode at a beam energy of 5 keV. The lithium metal samples imaged were quickly transferred from a vial sealed under argon atmosphere to the SEM chamber to minimize atmospheric exposure. To measure film thickness, a sharp blade was used to cut down the center of the film, and the cross section was viewed under SEM at a 30° angle.

X-ray photoelectron spectroscopy measurements were carried out with a AXIS Supra by Kratos Analytical Inc. using monochromatized Al Kα radiation (hv=1486.7 eV) as X-ray source with a base pressure of 10$^{-8}$ Pa. To avoid moisture or air exposure, the XPS spectrometer was directly connected to argon atmosphere filled glove box in which samples were prepared for analysis. The analyzed area of all XPS spectra was 300×700 µm$^2$. XPS was performed with a pass energy of 15 kV and high-resolution scans with a step size of 0.05 eV were collected after a survey scan with a step size of 1.0 eV, for lithium 1s, carbon 1s, oxygen 1s, nitrogen 1s, fluorine 1s, and cobalt 2p regions. All of the obtained XPS spectra were analyzed by CasaXPS software and calibrated with a hydrocarbon C 1s signal at 284.6 eV. Core peaks were performed using nonlinear Shirley-type background. The curves were smoothed by a weighted least-squares algorithm and fitted by line shaped composed of 70% Gaussian and 30% Lorentzian. Lithium metal samples were not washed, but in the case of liquid electrolyte, were allowed to dry to remove the majority of the electrolyte from the surface. Cycled LiCoO$_2$ electrodes were discharged to 3.5 V vs. Li before XPS analysis and were washed with dimethyl carbonate to remove residual salt. Samples were prepped under argon atmosphere.

Numerical Calculations

Ionization potentials and electron affinities of solvents were calculated via ab initio molecular orbital theory using Gaussian 09W on an isolated molecule in the gas phase. Solvent structures were first geometrically optimized in the ground state at the B3LYP/6–31+g(d,p) level of theory. The ionization potential and electron affinity were calculated from the difference in the electronic energy between the ground state and radical solvent molecules with identical ground state geometry through a vertical electronic transition (Franck-Condon principle). Electrostatic maps of the solvents were visualized via GaussView.

XPS Analysis

XPS spectra for lithium foil submerged in fluoromethane for three days is shown in FIGS. 12A and 12AA. FIGS. 12A and 12AA show lithium metal after being submerged in fluoromethane for three days. No washing of the lithium electrode was done prior to XPS analysis. Two peaks at 54.1 and 55.5 eV in the Li 1s spectrum correspond to $CH_3Li$ and LiF respectively, which is in agreement with the XRD and FTIR data shown in FIG. 19 and FIG. 20, respectively. In the C 1s spectrum, the peak at 283.4 eV attributed to $CH_3Li$ (57) and the wide peak C—F peak at 288 eV is thought to originate possibly from reduction of fluoromethane via proton abstraction, leaving the C—F bond intact. The small C—O peak at 286.3 eV and the peak at 531.3 eV in the O 1s spectra must result from the oxygen impurities in both the lithium metal and fluoromethane solvent since no other source of oxygen is present. The LiF (684.6 eV) and C—F (686.7 eV) peaks in F 1s spectra agree with peaks in Li 1s and C 1s spectra. The resulting analysis supports the theory that fluoromethane is decomposed on the lithium metal surface, in which LiF and $CH_3Li$ are main products. However, the layer formed on the lithium surface is not compact or electrically insulating enough to prevent the further reduction of the solvent, which results in complete decomposition of the lithium metal.

Carbon dioxide is reduced at the lithium surface to form a thin and electrically insulating $Li_2CO_3$ layer, as evidenced in both the Li 1s spectrum (54.5 ev) and the C 1s spectrum (289.5 eV). The LiF peaks at 55.5 eV and at 684.7 eV in the Li 1s and the F 1s spectra, respectively, which indicate that fluoromethane is still reduced at the lithium surface even with addition of $CO_2$. Methyl lithium, however, is absent in the bulk of the SEI, since $CO_2$ is thought to react with $CH_3Li$ to form $CH_3CO_2Li$ and may still further decompose into other compounds, which may additionally contribute to the C—O peaks at 286.3 and 533.4 eV. The formed SEI composed of LiF and $Li_2CO_3$ acts as a suitable passivation layer to prevent further chemical reduction of the electrolyte system.

The surface of the lithium metal counter electrode used in platting and stripping experiments was analyzed with XPS after 400 cycles with data shown in FIGS. 12C and 12CC. FIGS. 12C and 12CC show lithium metal after being cycled 400 times in 0.2 M LiTFSI in $FM:CO_2$ 19:1. No washing of the lithium electrode was done prior to XPS analysis. All peaks seen in the non-cycled lithium metal surface in FIGS. 12B and 12BB are also present in the cycled lithium metal surface except the C—O peak at 533.4 eV, which is possibly due to a lower formation rate of $CH_3Li$ decomposition products during cycling. FIGS. 12B and 12BB show lithium metal after being submerged in $FM:CO_2$ 19:1 for three days. No washing of the lithium electrode was done prior to XPS analysis. An additional peak is visible at 292.0 eV due to the C—$F_3$ bonding in the C 1s spectrum, which corresponds to trace LiTFSI salt in the SEI surface or possibly to $CHF_3$ from reduced $TFSI^-$ the ion. Further comparing cycled and non-cycled spectra, there is an apparent increase in $Li_2CO_3$ relative to other components and makes up the majority of the SEI. This indicates the reduction of carbon dioxide, even at 5 wt %, is greatly preferred to the reduction of fluoromethane during electrode cycling and is likely a primary reason for the high and stable plating and stripping efficiency seen in these novel electrolytes.

FIGS. 12D, 12DD, 12E and 12EE present typical XPS spectra for lithium metal which has been submerged and cycled (400 cycles) in a conventional liquid electrolyte system (1 M $LiPF_6$ in EC:DEC 1:1), respectively. FIGS. 12D and 12E show lithium metal after being submerged in 1 M $LiPF_6$ in EC:DEC 1:1, and lithium metal after being cycled 400 times in 1 M $LiPF_6$ in EC:DEC 1:1, respectively. No washing of the lithium electrode was done prior to XPS analysis. Lithium metal electrodes treated with numerous conventional liquid electrolytes and salts has been comprehensively investigated by many groups, particularly D. Aurbach's group. Previous studies revealed that both EC and DEC are reduced on the lithium surface to $ROCO_2Li$ species and small amount of ROLi. Further, LiF will be formed by the decomposition of $LiPF_6$. Our XPS results agree well with these results. In the C 1s spectrum, the peaks at 284.6, 286.3, 288.2 and 289.9 eV corresponds to hydrocarbon, C—O, O—C—O and —$OCO_2Li$ species, respectively. For LiF, both the 55.5 eV and 684.7 eV peaks appear in the spectrum. The peaks at 53.5 and 527.8 eV also reflect the formation of ROLi, which may be a decomposition product of a larger $RORO_2Li$ type polymer. The broad peak at 687.0 eV is assigned to F-P from $LiPF_6$ decomposition. After 400 cycles, the ROLi peaks at 53.5 and 527.8 eV disappeared, and the intensity of peaks associated to $ROCO_2Li$ increased. The peak at 533.3 eV increases after cycling, corresponding to formation of additional C—O bond species in the SEI layer. Further, the proportion of the F-P species also increases, which suggest that both the electrolyte and the $LiPF_6$ salt continuously decompose at the interface during cycling.

To explore the SEI layer formed at higher potentials, XPS was also performed on $LiCoO_2$ electrodes before and after five cycles at the C/10 rate at +25° C. (discharged to 3.5 V vs. Li prior to analysis). FIGS. 13A and 12AA show a XPS spectrum of a $LiCoO_2$ electrode prior to cycling. FIGS. 13A and 13AA show electrodes before cycling and after cycling five times from 3.5 to 4.1 V. The Co 2p shows a clearly distinguished profile with the 2p$^3$⁄2 and 2p½ components at 780.3 eV and at 795.1 eV. The satellite peaks are located 10 eV higher in binding energy than the main peaks, as expected. The peaks at 54.3 eV and at 529.6 eV in the Li 1s and O is spectra, respectively, correspond to bulk $LiCoO_2$. The broad peak at 531.6 eV of the O is spectrum results from both organic species and surface defects of $LiCoO_2$, which have a deficient coordination. The peaks located at 290.7 and 688.0 eV in Li 1s and F 1s spectra, respectively, are attributed to the C—$F_2$ bond present in the PVDF binder. These peak positions correspond well with previously reported data.

After five cycles in the liquefied gas electrolyte (0.2 M LiTFSI in $FM:CO_2$ there was little change from the pre-cycled spectrum shown in FIGS. 13B and 13BB. FIGS. 13B and 13BB show $LiCoO_2$ cycled five times with 0.2 M LiTFSI in $FM:CO_2$ 19:1. There are small peaks in the Li 1s, C 1s and O 1s spectra corresponding to residual salt, which was not removed through washing with dimethyl carbonate.

Since carbon dioxide is expected to be stable at the potentials seen at this electrode surface and there is no other source of oxygen, the increased peak seen in the O 1s spectra is thought to be due to a change of the surface oxygen of the LiCoO$_2$ electrode and not related to the formation of an additional surface layer on the electrode. There were no other major changes seen in the XPS spectra, indicating very little, if any, SEI layer is formed on the surface of the cathode in the fluoromethane-based electrolyte system.

In contrast to the fluoromethane-based electrolyte, after five cycles in a conventional liquid electrolyte (1 M LiPF$_6$ in EC:DEC 1:1), there is substantial change in the F 1s and O 1s XPS spectra, shown in FIGS. 13C and 13CC. FIGS. 13C and 13CC shows LiCoO$_2$ cycled five times with 1 M LiPF$_6$ in EC:DEC 1:1. XPS spectra in FIGS. 13B and 13C were taken in the lithiated state at 3.5 V vs. Li after washing with dimethyl carbonate. The new peak at 685.2 eV is characteristic of LiF, which is also evident with the appearance of the LiF characteristic peak at 56.3 eV in Li 1s spectrum. The LiF component is commonly cited to be a decomposition product of the PF$_6^-$ anion at the cathode surface. Further, there are numerous peaks that appear in the O 1s spectrum, including a peak at 534.7 eV which is assigned to oxygen atoms in fluorophosphate intermediates, namely, Li$_x$PF$_y$O$_z$. The decomposition of the electrolyte at the surface of the LiCoO$_2$ cathode and resulting SEI greatly contributes to the increased impedance of the cathode, particularly at low temperatures.

Safety and Environmental Aspects

Hydrofluorocarbons are commonly used in the refrigerant and microelectronics industries. As the use of these solvents in electrolytes for energy storage devices is not common, it is important to note the associated safety and environmental concerns. With high volatility, little solubility in water and their relatively chemically stable nature, the hydrofluorocarbon solvents themselves are generally non-toxic. However, their combustion or decomposition products may include hydrogen fluoride which may be highly toxic to humans. Throughout the scope of this work, caution was taken, and there was never an instance of fire combustion. However, there was a single instance where hydrogen fluoride was noted to be evolved, which was from the chemical decomposition of liquid 2-fluoropropane at a relatively high temperature (indicated by a damaged glass conductivity measurement electrode inside solution), after which the use of this solvent was ceased. The hydrofluorocarbon solvents studied range from non-flammable to highly flammable and with low to high global warming potential. In general, highly/lower fluorinated compounds will show lower/higher flammability and higher/lower global warming potential. The global warming potentials of the hydrofluorocarbons studied are tabulated in Table 4.

Table 4 shows global warming potentials of liquefied gas solvents. Global warming potentials (GWP) of selected liquefied gas solvents studied (69) are listed.

TABLE 4

| Solvent | 100 Year GWP |
|---|---|
| Carbon Dioxide | 1 |
| Fluoromethane | 92 |
| Difluoromethane | 675 |
| Fluoroethane | 12 |
| 1,1-Difluoroethane | 124 |
| 1,1,1,2-Tetrafluoroethane | 1430 |
| 2-Fluoropropane | N/A |

In some embodiments, solvents were stored in recovery tanks after their use to limit their release to the atmosphere. If these solvents were used on a large scale in energy storage devices, a properly hermitically sealed cell should prevent their release to the atmosphere and proper end-of-life recycling should be incorporated. A more thorough review of safety and environmental concerns relating to hydrofluorocarbons is given elsewhere. Throughout the scope of this work, high-pressure stainless-steel cells and tubing was used with substantially higher rated pressures than the highest vapor pressures of the solvents. While the vapor pressures of the solvents themselves are moderate, considerable pressure may be observed at higher temperatures if the thermal expansion of the solvents is restricted and caution should be taken in these scenarios.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An electrochemical device, comprising:
   an ionically conducting electrolyte comprising a mixture of one or more solid or liquid salts and a solution of one or more liquefied gas solvents, wherein the liquefied gas solvent comprises at least a first component that has a vapor pressure above 1.01325 bar at a room temperature of 20° C. and the first component comprises one or more chemicals selected from the group consisting of: sulfur dioxide, thionyl fluoride, thionyl chloride fluoride, phosphoryl fluoride, phosphoryl chloride fluoride, sulfuryl fluoride, sulfuryl chloride fluoride, fluoromethane, difluoromethane, fluoroethane, difluoroethane, chloromethane, chloroethane, ammonia, oxygen, nitrogen, carbon dioxide, tetrafluoroethane, and difluorochloromethane;
   a housing enclosing the ionically conducting electrolyte under a pressurized condition to maintain the liquefied gas solvent at a pressure higher than 1.01325 bar and at a room temperature of 20° C.;
   a pair of electrodes in contact with the ionically conducting electrolyte; and wherein the one or more salts include one or more of: lithium bis(trifluoromethanesulfonyl)imide, lithium hexafluorophosphate, lithium perchlorate, lithium tetrachloroaluminate, lithium tetragaliumaluminate, lithium bis(fluorosulfonyl)imide, lithium aluminum fluoride, lithium hexafluoroarsenate, lithium chloroaluminate, lithium chlorotitanate, lithium hexafluorotitanate, lithium tetrabromoaluminate, lithium tetrachloroborate, lithium tetrafluoroborate, lithium tetrachloroaluminate, sodium hexafluorophosphate, and magnesium hexafluorophosphate.

2. The electrochemical device of claim 1, wherein at least one of the electrodes is comprised of any one of lithium, sodium, calcium, magnesium, aluminum, iron, zinc, cadmium, lead, and potassium.

3. The electrochemical device of claim 1, further comprising additives that include one or more of: lithium chloride, lithium fluoride, sodium fluoride, sodium chloride, bromine chloride, bromo fluoride, chloride, and fluoride.

4. The electrochemical device of claim 1, wherein the anode is comprised of one or more of: lithium, sodium, calcium, magnesium, aluminum, iron, zinc, cadmium, and lead.

5. The electrochemical device of claim 1, wherein the pair of electrodes comprises a cathode current collector comprised of one or more of: activated carbon, carbon black, and carbon nanotubes.

6. The electrochemical device of claim 1, wherein the electrolyte is also a catholyte.

7. The electrochemical device of claim 1, wherein at least one of the pair of electrodes is comprised of sulfur or oxygen, such that lithium sulfides or lithium oxides are generated in a reversible reaction.

* * * * *